(12) United States Patent
Baril et al.

(10) Patent No.: US 9,594,665 B2
(45) Date of Patent: Mar. 14, 2017

(54) REGRESSION EVALUATION USING BEHAVIOR MODELS OF SOFTWARE APPLICATIONS

(71) Applicant: Microsoft Technology Licensing, LLC, Redmond, WA (US)

(72) Inventors: Bryce B. Baril, Lynnwood, WA (US); Alexander G. Gounares, Kirkland, WA (US); Russell S. Krajec, Loveland, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/198,284

(22) Filed: Mar. 5, 2014

(65) Prior Publication Data

US 2015/0254161 A1 Sep. 10, 2015

(51) Int. Cl.
*G06F 11/36* (2006.01)
*G06F 11/34* (2006.01)

(52) U.S. Cl.
CPC ...... *G06F 11/3616* (2013.01); *G06F 11/3409* (2013.01); *G06F 11/3447* (2013.01); *G06F 11/3452* (2013.01); *G06F 11/3466* (2013.01); *G06F 11/3428* (2013.01); *G06F 2201/865* (2013.01)

(58) Field of Classification Search
CPC ............. G06F 11/3616; G06F 11/3409; G06F 11/3428; G06F 11/3452; G06F 11/3466; G06F 11/3447; G06F 2201/865
USPC .................................................. 717/124, 127
See application file for complete search history.

(56) References Cited

U.S. PATENT DOCUMENTS

| | | | | |
|---|---|---|---|---|
| 6,163,840 | A * | 12/2000 | Chrysos et al. | 712/227 |
| 6,282,701 | B1 * | 8/2001 | Wygodny et al. | 717/125 |
| 6,311,327 | B1 * | 10/2001 | O'Brien | G06F 11/3466 |
| | | | | 714/35 |
| 6,971,019 | B1 | 11/2005 | Nachenberg | |
| 7,181,768 | B1 | 2/2007 | Ghosh | |

(Continued)

OTHER PUBLICATIONS

Zhuowei, et al., "Utilizing Statistical Characteristics of N-grams for Intrusion Detection", Dec. 2003, IEEE, 8 pages.

Marceau, "Characterizing the Behavior of a Program Using Multiple-Length N-grams", 2005, Odyssey Research Associates, Ithica, NY, pp. 1-10.

(Continued)

*Primary Examiner* — Viva Miller
(74) *Attorney, Agent, or Firm* — Ben Tabor; Kate Drakos; Micky Minhas

(57) ABSTRACT

Comparisons of different versions of an application may be compared using a behavior model of the application. A behavior model may be derived from n-gram analysis of observations of the application in production. The behavior model may include sequences of inputs received by the application or functions performed by the application, where each sequence is an n-gram observed in tracer data. Each n-gram may be coupled with a resource consumption to give a behavior model with performance data. A regression analysis may apply a behavior model derived from a first version of an application to the performance observations of a new version to create an expected performance metric for the new version. A similarly calculated metric from a previous version may be compared to the metric from a new version to determine an improvement or degradation of performance.

18 Claims, 16 Drawing Sheets

(56) References Cited

U.S. PATENT DOCUMENTS

| | | | |
|---|---|---|---|
| 8,214,365 B1* | 7/2012 | Manadhata | G06K 9/6272 |
| | | | 707/737 |
| 8,644,342 B2 | 2/2014 | Stolfo et al. | |
| 8,665,743 B2 | 3/2014 | Zhu et al. | |
| 8,910,120 B2 | 12/2014 | Srinivasa et al. | |
| 2002/0138788 A1 | 9/2002 | Yenne et al. | |
| 2003/0110474 A1 | 6/2003 | Ur et al. | |
| 2006/0150163 A1 | 7/2006 | Chandane | |
| 2007/0208822 A1 | 9/2007 | Wang | |
| 2008/0010539 A1 | 1/2008 | Roth | |
| 2008/0168433 A1* | 7/2008 | Arnold et al. | 717/158 |
| 2008/0208536 A1 | 8/2008 | Bondi | |
| 2009/0037893 A1 | 2/2009 | Brodsky et al. | |
| 2009/0183143 A1 | 7/2009 | Li et al. | |
| 2011/0072418 A1 | 3/2011 | Kalamegham | |
| 2012/0017195 A1 | 1/2012 | Kaulgud et al. | |
| 2012/0084759 A1 | 4/2012 | Candea et al. | |
| 2012/0159250 A1 | 6/2012 | Aull et al. | |
| 2012/0278658 A1 | 11/2012 | Han et al. | |
| 2012/0284691 A1 | 11/2012 | Aljammaz et al. | |
| 2013/0091387 A1 | 4/2013 | Bohnet et al. | |
| 2013/0191915 A1 | 7/2013 | Antokakis et al. | |
| 2013/0219272 A1* | 8/2013 | Balasubramanian | |
| | | et al. | 715/704 |
| 2013/0283241 A1 | 10/2013 | Krajec | |
| 2014/0019929 A1 | 1/2014 | Raviv | |
| 2014/0215444 A1 | 7/2014 | Voccio | |
| 2014/0245268 A1 | 8/2014 | Golender | |
| 2015/0254151 A1 | 9/2015 | Baril et al. | |
| 2015/0254162 A1 | 9/2015 | Baril et al. | |
| 2015/0254163 A1 | 9/2015 | Baril et al. | |
| 2015/0254165 A1 | 9/2015 | Baril et al. | |
| 2015/0254172 A1 | 9/2015 | Baril et al. | |

OTHER PUBLICATIONS

Ghosh, et al., "Learning Program Behavior Profiles for Intrusion Detection", 1999, USENIX Association, 13 pages.
U.S. Appl. No. 14/198,254, Jan. 29, 2015, Office Action.
U.S. Appl. No. 14/198,254, Jul. 2, 2015, Office Action.
U.S. Appl. No. 14/198,271, Sep. 25, 2015, Notice of Allowance.
Nessa, et al., "Software Fault Localization Using N-gram Analysis", 2008, 12 pages.
Christian, et al., "A Close Look on n-Grams in Intrusion Detection: Anomaly Detection vs. Classification", Nov. 4, 2013, 10 pages.
Notice of Allowance dated Feb. 18, 2016 cited in U.S. Appl. No. 14/198,254.
Notice of Allowance dated Feb. 24, 2016 cited in U.S. Appl. No. 14/198,271.
Office Action dated Mar. 11, 2016 cited in U.S. Appl. No. 14/198,296.
"International Search Report Received for PCT Application No. PCT/IB2014/062278", Mailed Date: Dec. 30, 2014, 4 pages.
Notice of Allowance dated Oct. 30, 2015 cited in U.S. Appl. No. 14/198,271.
Notice of Allowance dated Nov. 6, 2015 cited in U.S. Appl. No. 14/198,254.
Office Action dated Feb. 1, 2016 cited in U.S. Appl. No. 14/198,284.
Office Action dated May 18, 2016 cited in U.S. Appl. No. 14/198,223.
Office Action dated Aug. 18, 2016 cited in U.S. Appl. No. 14/198,239.
Office Action dated Sep. 21, 2016 cited in U.S. Appl. No. 14/198,296.
Yuan et al. "Automated Known Problem Diagnosis with Event Traces" Apr. 18-21, 2006, 14 pages.
Office Action dated Nov. 3, 2016 cited in U.S. Appl. No. 14/198,223.

* cited by examiner

1100
EXECUTING REGRESSION TESTS

REGRESSION EVALUATION USING BEHAVIOR MODELS OF SOFTWARE APPLICATIONS

BACKGROUND

Tracing a software application is a mechanism for gathering performance and operational data while the application executes. Tracers may be deployed in a development or testing environment, where the data may be used to understand how the application performs under simulated loads. When deployed in production, a tracer may gather usage data that reflects the actual loads and performance of the application in response to those loads.

Tracing may be performed at different levels, where a heavyweight tracer may gather a large amount of data but may consume a large amount of overhead. A lightweight tracer may consume less overhead but may consume fewer less accurate or more generalized data. In some cases, the overhead may exceed 10 times the amount of resources that the application consumed on its own.

Software testing is a step in software development where an application may be tested using simulated loads and inputs to exercise the application. The application's behavior may be captured using a tracer or other data gathering system. In many cases, the simulated loads may reflect the expected loads that the application may experience.

SUMMARY

Execution sequence information may be analyzed and quantified using n-gram analysis of functions executed by an application. The sequences of functions may be represented by n-grams, and the frequency of the various n-grams may indicate the behavior of the application in production, which may be compared to a test suite whose coverage may be quantified using a similar n-gram analysis. A coverage factor may compare the observed behavior of the application in production to the test suite for the application. The n-grams may be further quantified or prioritized by resource utilization, and several visualizations may be generated from the data.

Input sequence information may be analyzed and quantified using n-gram analysis of inputs received by an application. The sequences of inputs may be represented by n-grams, and the frequency of the various n-grams may indicate the 'real world' uses of the application in production, which may be compared to a test suite whose coverage may be quantified using a similar n-gram analysis. A coverage factor may compare the observed inputs to the application in production to the test suite for the application. The n-grams may be further quantified or prioritized by resource utilization and several visualizations may be generated from the data.

N-grams of input streams or functions executed by an application may be analyzed to identify security breaches or other anomalous behavior. A histogram of n-grams representing sequences of executed functions or input streams may be generated through baseline testing or production use. An alerting system may compare real time n-gram observations to the histogram of n-grams to identify security breaches or other changes in application behavior that may be anomalous. An alert may be generated that identifies the anomalous behavior. The alerting system may be trained using known good datasets and may identify deviations as bad behavior. The alerting system may be trained using known bad datasets and may identify matching behavior as bad behavior.

Regression testing of an application may gather performance tests for multiple functions within an application and determine when performance changes from one version of the application to another. The analysis may be further broken down by input sequences that may be processed by various functions. A detailed regression analysis may be presented as a heat map or other visualizations. A regression testing system may be launched during a build process by automatically launching a set of performance tests against an application. In many cases, the application may be executed in a system with a known or consistent performance capabilities. The application may be executed and tested in a new version and at least one prior version on the same hardware and software execution environment, so that results may be normalized from one execution run to another. A regression testing system may be deployed as a paid-for service that may integrate into a source code repository.

Comparisons of different versions of an application may be compared using a behavior model of the application. A behavior model may be derived from n-gram analysis of observations of the application in production. The behavior model may include sequences of inputs received by the application or functions performed by the application, where each sequence is an n-gram observed in tracer data. Each n-gram may be coupled with a resource consumption to give a behavior model with performance data. A regression analysis may apply a behavior model derived from a first version of an application to the performance observations of a new version to create an expected performance metric for the new version. A similarly calculated metric from a previous version may be compared to the metric from a new version to determine an improvement or degradation of performance.

A behavior model for a software application may identify a set of execution sequences that begin from a set of origins. The sequences may be further defined by a set of exits. In some cases, the sequences may be decomposed into subsequences or n-grams. The execution sequences and their frequencies may define a usage or behavior model for the application. The sequences may be defined by semantic level operations of an application, which may be defined by functions, call backs, API calls, or other blocks of code execution. The behavior model may be used for determining code coverage, comparing versions of applications, and other uses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
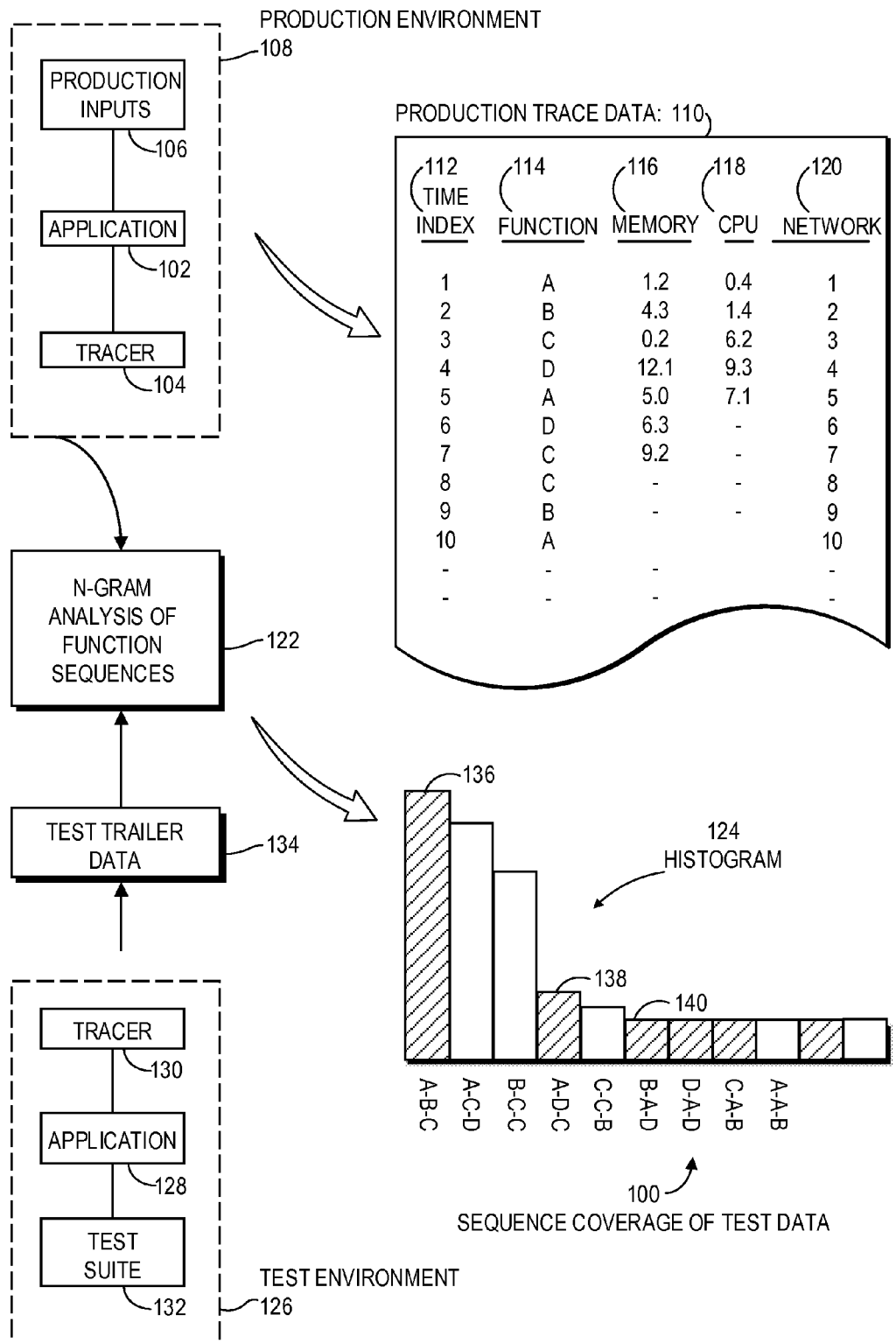
FIG. 1 is a diagram illustration of an embodiment showing a method for determining coverage of test data using n-gram analysis.

N-Gram Analysis of Software Behavior in Production and Testing Environments

A test suite for an application may be developed in part based on tracer data that may be collected from observing the application in a production environment. The tracer data may be analyzed to identify sequences of functions that may be executed, along with sequences of input data.

Programming environments that allow for asynchronous operations may be difficult to fully test because the sequence of input parameters may cause an application to behave differently because of the asynchronous nature of the application. Such asynchronous operations may have multiple threads or execution streams being executed on the same or different processors but with little or no synchronizing elements between them. The behavior of such applications can be drastically affected by input loads, but such behavior is very difficult to predict a priori.

The sequence of function execution and parameters being passed to an application can cause the application to behave differently, but every conceivable combination of functions and parameters may be unbounded and therefore may not be able to be tested. By analyzing tracer data from production uses of an application, a histogram of sequences may be identified by frequency of use and the most frequently observed sequences may be used as a benchmark to evaluate test coverage, among other uses.

The sequence analyses may be performed using n-grams, where n-grams may be created for short sequences of functions. The n-gram analysis may extract each n-gram from the function sequences, then count the frequency of occurrence for each n-gram.

A coverage parameter may be created that expresses the percentage of observed sequences that are contained in a test suite for an application. The tested sequences may be compared to the histogram of observed sequences to determine the relative importance of the sequences. When the histogram of observed sequences is normalized to 100% of the observations, the observed percentage of each tested sequence can be aggregated to determine a coverage percentage.

N-Gram Analysis of Inputs to a Software Application

An n-gram analysis of inputs received by a software application may produce a histogram of input parameter sequences that have been observed for an application. Such an analysis may be performed on tracer data gathered while executing the application in production, then compared to the inputs used during testing.

N-grams may be constructed of sequences of input parameters. The n-grams may be constructed in many different manners, depending on the application and situation. For an application that processes text, n-grams may be constructed of sequences of letters, words, phrases, or other sub-elements extracted from an input stream. For an application that processes other types of requests, the n-grams may be constructed from sequences of parameters, sequences of request types, or other sequences.

The n-gram analysis may result in some characterization of an input stream received by an application. Such an analysis may be performed without instrumenting or profiling the application itself, and may be performed by intercepting or monitoring merely the input stream. Such instrumentation may be easier to deploy in some circumstances than deep profiling or function level instrumentation of an application.

N-gram analysis of input streams may be used to compare production behavior with tests used in the development and deployment cycle of an application. A notion of test coverage may be determined by mapping n-grams derived from a test suite to the n-grams observed in a production environment.

Security Alerting Using N-Gram Analysis of Program Execution Data

A security alerting system may monitor an executing application to detect n-grams as they occur, then compare the observed n-grams to the historically observed n-grams. Abnormalities may indicate security breaches or other problems, and alerts or other action may be taken in response.

A historical database of input or function sequences may be analyzed using n-gram analysis tools to determine an expected set of behaviors for an application. The expected set of behaviors may be defined in a database of n-grams with an expected frequency of the observed sequences. The database of n-grams may be deployed to an alerting system on a production device, or may be used on a second device to analyze observations gathered on a first device.

The database may be automatically generated by analyzing historical records. Such records may be selected from test data or from a period of known acceptable behavior. In such embodiments, the accuracy and effectiveness of the alerting system may be enhanced by analyzing ever larger datasets.

The database may benefit from input from human experts in some cases. Certain sequences of inputs or functions may be flagged as undesirable. One mechanism for such input may be for a human expert to identify a portion of an application that may have an expected limited frequency of use. For example, an application may include a query to a database. In the example, a user may identify such operations as being performed once per incoming request. An alerting system may monitor such operations and generate an alert when the database queries become excessive, which may indicate that a hacker may be downloading data in an unauthorized manner.

An n-gram analysis may be performed on known good training data as well as known bad training data. For example, a set of normal operations of an application may be gathered where there were no known problems. From such a database, an n-gram analysis may generate a behavior model of a properly functioning application. A second set of training data may include operations that may be defined as bad, and a second behavior model may be generated. When the application is being monitored in production, an alerting system may compare the application's behavior to the known good behavior model to detect any deviation from the model. The alerting system may also compare the application's behavior to the known bad behavior model as a second check to detect any known bad behavior.

An n-gram-based alerting system may be able to detect deviation from a set of behaviors defined in a training dataset. The training dataset may include known good behaviors or known bad behaviors, and in either case, an alerting system may be able to determine with some statistical certainty that the behavior conforms or not to the behavior represented in the training data. When the training dataset represents known good behavior, deviations may be considered bad behavior. When the training dataset represents known bad behavior, matches may be considered representative of the bad behavior, while deviations may be considered either good behavior or an example of a different bad behavior. As such, some embodiments may use one, two, three, or more training datasets that collectively may represent good behavior, bad behavior, or combinations of different types of behavior.

Automated Regression Testing for Software Applications.

Regression testing may be performed on successive versions of an application to determine whether performance improved, stayed the same, or decreased. The testing data may be collected for each function in the application, and may be collected for different sequences of inputs.

The regression testing may identify functions whose performance may have changed as a new version is released, which may be useful feedback to developers. Those functions for which performance was degraded may be further investigated and improved. The long term evaluation of an application's or function's performance over multiple versions may indicate how well a development team is improving their code.

The automated regression testing may be launched each time a new version is built. As part of the build process, a set of performance tests may be executed against the application under test, and a tracer may gather performance data. In some cases, such tests may be performed multiple times to get a statistically relevant sample.

Automated regression testing may be performed on similar or dissimilar execution platforms at each execution. When similar execution platforms are used, the execution platforms may be as identical as possible so that performance tests on one version of the application under test may be comparable to tests performed on a previous version of the application. When automated regression testing may be performed on different execution platforms from one version to another, various techniques may be applied to compare the two sets of test results.

Automated regression testing may be performed on multiple versions of an application where the tests may be executed on the same execution platform. Such tests may allow meaningful comparisons between the versions that may be tested. When multiple such tests are performed at each new version of an application release, a complete history of the application's releases may be generated.

The execution platform for performing a regression test may include hardware, software, network, and other components. The hardware platform may include processor, memory, storage, and various peripherals and interfaces. The software components may include operating systems, virtual machines, services, libraries, applications, databases, and other components. The network components may include services, streams, devices, or other traffic that may be live or simulated during performance tests.

An automated regression testing service may be sold as a line of business. As a paid-for or free service, a regression test may be performed as part of a build/test process. The regression test may be triggered as part of a more extensive test suite that may perform unit tests, integration tests, system tests, and other types of tests. The regression testing service may produce various visualizations or graphs that display the regression test results. In a free version of the service, regression testing may be performed on open source or other publically available libraries and at least some of the results may be made available to the public.

Regression Evaluation Using Behavior Models of Software Applications

Regression evaluation of software applications may use behavior models to compare one version of the application to another. A behavior model may be generated from production or test data on a first version of the application. The behavior model may be populated with resource consumption from the first version of the application to generate a statistic representing the first version. Using the same behavior model, resource consumption observations from the second version of the application may generate a statistic representing the second version.

The behavior model may be a group of n-grams that represent sequences of functions or input parameters to the application. For each n-gram, the frequency of observations may be multiplied by resources consumed by the n-gram. These calculations may be summed for all or a portion of the n-grams to determine a single resource consumption metric for the application.

The regression testing may calculate the n-grams and their frequency for a baseline version of an application to generate a baseline behavior model. The baseline behavior model may be used to compare the performance aspects of the two versions of the application. Such an analysis may weight the performance observations by the frequency that each n-gram may typically be observed in production. Such an analysis may make a realistic and quantifiable comparison between two versions.

The behavior model may give more weight to those sequences of functions or inputs that are most commonly observed. This feature may result in relatively small performance improvements of frequently used portions of the application may have a larger overall effect than relatively large performance improvements in portions of the application that are not frequently used.

Behavior Models Derived from Origin Analysis of Software Application Performance.

A behavior model of a software application may be generated using origins and exits of program flow. The behavior model may be used to compare versions, determine code coverage, and other uses, as well as to help developers and testers understand the usage behavior of an application in production.

The behavior model may be derived from execution sequences that share a common origin or set of origins. An origin may be any location within an application from which a sequence may be defined. In many cases, an origin may be an entry point or starting point for a code path of interest.

The origins may be defined in many different ways. In some cases, an origin may be identified or annotated in an application, a tracer, the tracer data, or some other mechanism. A user may manually identify an origin in some cases, while in other cases origins may be automatically identified.

The behavior model may also be derived from exits of an execution sequence. An exit may be any ending of an execution sequence. In some cases, the execution sequence may halt or cease at an exit, in other cases, execution may continue past an exit.

The origins and exits may define places of interest in an execution sequence for further analysis. In some cases, the origins and exits may be a mechanism to select portions of a tracer database. For example, a user may wish to analyze the performance and behavior from a single origin or set of origins. The user may select a subset of the tracer data and apply analytics and behavior models to the subset. From such a subset, the user may learn how the application behaved in the area of code following the origin.

Similarly, an exit may be used to select a subset of the tracer data. For example, a user may wish to examine the sequences of execution that resulted in a specific exit. Such a selection may help the user understand the application behaviors that resulted in a given exit.

The origin and exits may be defined as locations within the executable code, as well as with additional modifiers. A location within executable code may be include a function name or line of source code. In some cases, a modifier to the origin or exit may include a parameter or variable value, system or other state, or some other parameter. The locations may also be defined as functions, call backs, application programming interface calls, or other blocks of code execution.

Throughout this specification and claims, the term "module" is used to define a group of reusable code that may be incorporated into an application. A component may be known as a 'component', 'library', 'subroutine', or some other notion. For the purposes of this specification and claims, these terms are considered synonymous.

The "module" may be code that is arranged in a way that multiple applications may access the code, even though the applications may have no connection with each other. In general, a "module" may be code that is configured to be reused. In some cases, a component may be reused within the scope of a large application, while in other cases, the component may be shared to other application developers who may use the component in disparate and unconnected applications.

Many programming languages and paradigms have a notion of a "module" or library, where the component may have a defined interface through which an application may invoke and use the component. Some paradigms may allow a programmer to incorporate a component in a static manner, such that the component code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or components may remain the same.

Modules may be distributed in source code, intermediate code, executable code, or in some other form. In some cases, modules may be services that may be invoked through an application programming interface.

Throughout this specification and claims, the term "modules" may be applied to a single reusable function. Such a function may be distributed as part of a library, module, or other set of code, and may reflect the smallest element of reusable code that may be distributed. A single "module" as referenced in this specification and claims may be an individual application programming interface call or callable subroutine or function, as well as a module, library, or other aggregation of multiple callable functions, application programming interface calls, or other smaller elements.

Throughout this specification and claims, the term "function" may be applied to a section of executable code. In some cases, a function may be a single line of code, or may be several lines of code that perform a set of operations. A function may be a subroutine or other group of code that may be executed as a group. In some cases, functions may be reusable sets of code within a larger application, module, or other set of code. For the purposes of this specification and claims, the term "function" may refer to any portion of code within an application, module, or other larger code base. In many cases, a function may be implied or expressly defined in the larger code base.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced. The collected data may also include cache misses, garbage collection operations, memory allocation calls, page misses, and other parameters.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration showing determining sequence coverage for a test. Sequence coverage is a degree to which a test implements the function sequences that were observed in a production environment. The process operates by analyzing trace data from a production environment and determining a usage frequency for n-grams of functions. Next, the test suite is analyzed to determine which n-grams were tested, and the two sets of n-grams are compared to determine a sequence coverage.

The sequence of functions observed in tracer data may undergo n-gram analysis to identify frequently observed sequences. These sequences may reflect the actual manner in which an application is used and such information may be fed back to a test suite to ensure that the tests reflect 'real world' uses of the application.

In the example of embodiment 100, a production environment 108 may have an application 102 and tracer 104. The application 102 may respond to production inputs 106, and the tracer 104 may gather observations from the application 102 to create production trace data 110.

In the example of embodiment 100, the production environment 108 may represent any type of hardware and software computing environment where an application 102 may execute. The production environment 108 and the production inputs 106 may represent the environment in which a test suite is desired to emulate or cover.

The production trace data 110 as illustrated is merely a simplified example of tracer data that may be collected. A time index 112 may indicate the order in which the functions 114 may be executed. Various resource usage data may be collected for each of the functions 114, such as memory usage 116, process usage 118, and network usage 120. In many cases, a tracer 104 may collect other type of resource usage data, such as storage resource usage, input/output resource usage, peripheral resource usage, database resource usage, local and remote service usage, and other usage. In many cases, the production trace data 110 may include time stamps for starting and ending times for each of the various functions.

The production trace data 110 illustrates various functions 114 that may be analyzed using n-grams. The n-gram analysis may determine which sequences of functions are frequently observed, as well as which sequences consume the largest amount of resources. Such results may help develop tests that provide coverage for use cases that are relevant based on actual usage.

The n-gram analysis 122 may attempt to find bi-grams, tri-grams, and longer sequences of functions within the tracer data. The n-gram analysis may result in a histogram 124 of the various sequences.

The histogram 124 may illustrate a simplified histogram showing function tri-grams arranged from the most frequently used to the least frequently used. Each tri-gram may represent a single sequence of three functions. By sorting the tri-grams and arranging them in a histogram, a developer may realize that sequence A-B-C and A-C-D are the most frequently observed sequences in the production data. A developer may then attempt to build a test that exercises the sequences of functions A-B-C and A-C-D.

A test environment 126 may generate data that may be similarly analyzed. An application 128 may execute with a tracer 130 and execute a test suite 132. The test tracer data 134 may be analyzed using the same n-gram analysis 122 to determine any overlap in the test coverage with respect to the production data.

The histogram 124 may be used to illustrate the overlap in test coverage by highlighting those sequences that were found in the test data. In the illustration of embodiment 100, items 136, 138, 140, and others are illustrated as highlighted, which may represent that the test coverage only included the highlighted sequences but not the non-highlighted sequences.

The n-gram analysis 122 may be executed on any set of trace data. In many cases, the trace data may be a dataset gathered from a system with a single thread of execution. In other cases, the trace data may be a dataset gathered from a multi-threaded system. In such cases, the sequences may be analyzed within each thread or may be analyzed based on a sequence defined by timestamps for the initiation or completion of a function.

Multi-threaded systems may be analyzed by tracing individual execution threads and maintaining the sequences of functions executed within each thread. In such systems, the trace data may contain sequences of functions that were executed as a thread. Such tracers may be able to track transactions or events as they propagate through the executable code, even when multiple such transactions or events are being handled simultaneously. In some cases, a tracer may not have such capability but may gather each function as it occurred in time, without separating the functions into threads or transaction sequences.

Figure 2:
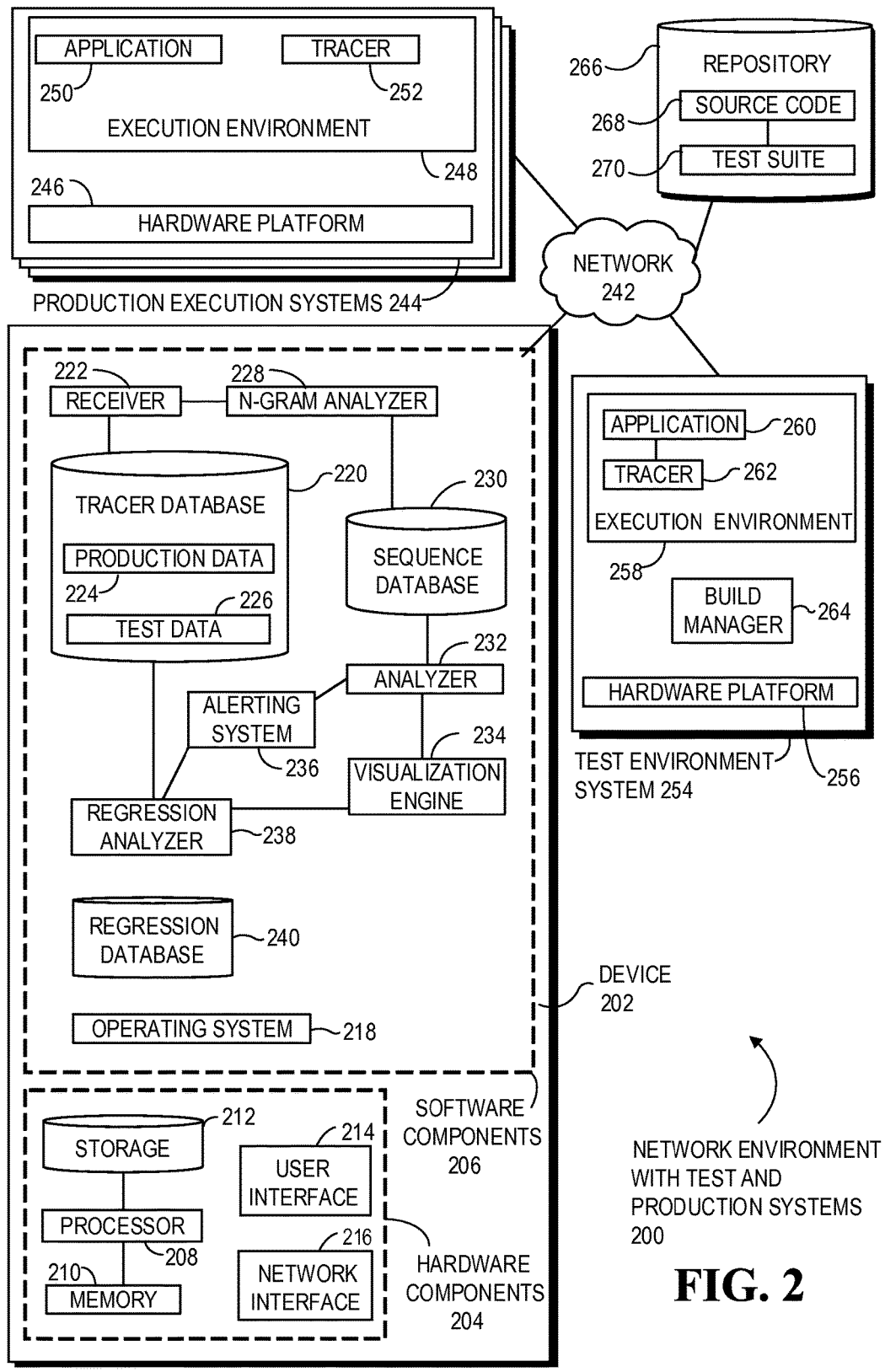
FIG. 2 is a diagram illustration of an embodiment showing a network environment with devices that may perform testing and tracer data analysis.

FIG. 2 is a diagram of an embodiment 200 showing components that may collect and process tracer data while an application executes. The components are illustrated as being on different hardware platforms as merely one example topology.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. The software components may include a tracer database 220, which may contain tracer data collected from many different sources. A receiver 222 may communicate with a tracer on a remote device and collect tracer data, then store the tracer data in the tracer database 220.

The tracer database 222 may contain tracer data in different formats and collected by different tracers. Production data 224 may data collected from 'production' uses of an application. Test data 226 may be collected when an application is undergoing development, build, and release. Production data 224 may, in some cases, be differentiated from test data 226 in that test data 226 may be synthetic or predefined inputs to the application, whereas production data 224 may be generated from actual uses of the application in the wild.

The production data 224 may be formatted differently or have different levels of detail than the test data 226. In a production environment, a tracer may be configured to be more lightweight and consume less overhead than in a test environment. In such cases, the test data 226 may be more detailed, may contain many more parameters, may not be aggregated or summarized, or may have other differences than production data 224.

An n-gram analyzer 228 may identify n-gram sequences of functions in tracer data. An n-gram may be sequences of one, two, three, four, five, or more functions that are identified in the tracer data. The n-gram analysis may identify the n-grams as well as count their frequency and generate other statistics. Such statistics may be stored in a sequence database 230.

An analyzer 232 may analyze data from the sequence database 230 and tracer database 220 to generate various visualizations which may be rendered by a visualization engine 234. An alerting system 236 may generate alerts or notifications when certain events are detected.

A network 242 may connect the device 202 to several other devices in a network environment.

A set of production execution systems 244 may execute an application and collect data in a 'real world' environment. The production execution systems 244 may be any collection of devices operating the application 250 in production. In some cases, the production execution systems 244 may be identical or similar systems, such as servers in a datacenter. In other cases, the production execution systems 244 may be very different, such as handheld phones and tablets, as well as desktop and server computers, each being different makes and models.

An execution environment 248 may execute the application 250. A tracer 252 may collect data while the application executes, then send the data to the receiver 222 on device 202.

A test environment system 254 may be used by a developer during design, testing, and debugging of an application. The test environment system 254 may execute on a hardware platform 256 and may include an execution environment 258 in which the application 260 may execute with a tracer 262. The test environment system 254 may attempt to create a consistent execution environment 258 for testing different versions of the application during its lifecycle. A build manager 264 may launch the application 260 and execute various test suites, which may include predefined inputs that may exercise the application 260 in various manners.

The build manager 264 may operate with a repository 266, which may contain source code 268 and various test suites 270. The build manager 264 may be an automated or semi-automated system that may launch when a new version of an application is uploaded to the repository 266. When new version of the application are exercised using a test suite, the tracer 262 may gather observations about the application's performance and send those data to the receiver 222 for storage in the tracer database 220. Such data may be stored as test data 226.

The tracer 262 may be a different tracer than tracer 252, or may the two tracers may be differently configured. In many cases, the tracer 262 in the test environment may be more detailed, gather data in a more granular fashion, and trace more parameters than the production tracer 252. In some cases, the opposite may be true, where the testing tracer 262 may be more lightweight and performance oriented than the production tracer 252. When the two tracers operate differently, the schemas defining the data transmitted to the tracer database 220 may be different. In some cases, the tracers 252 and 262 may be identically configured.

Figure 3:
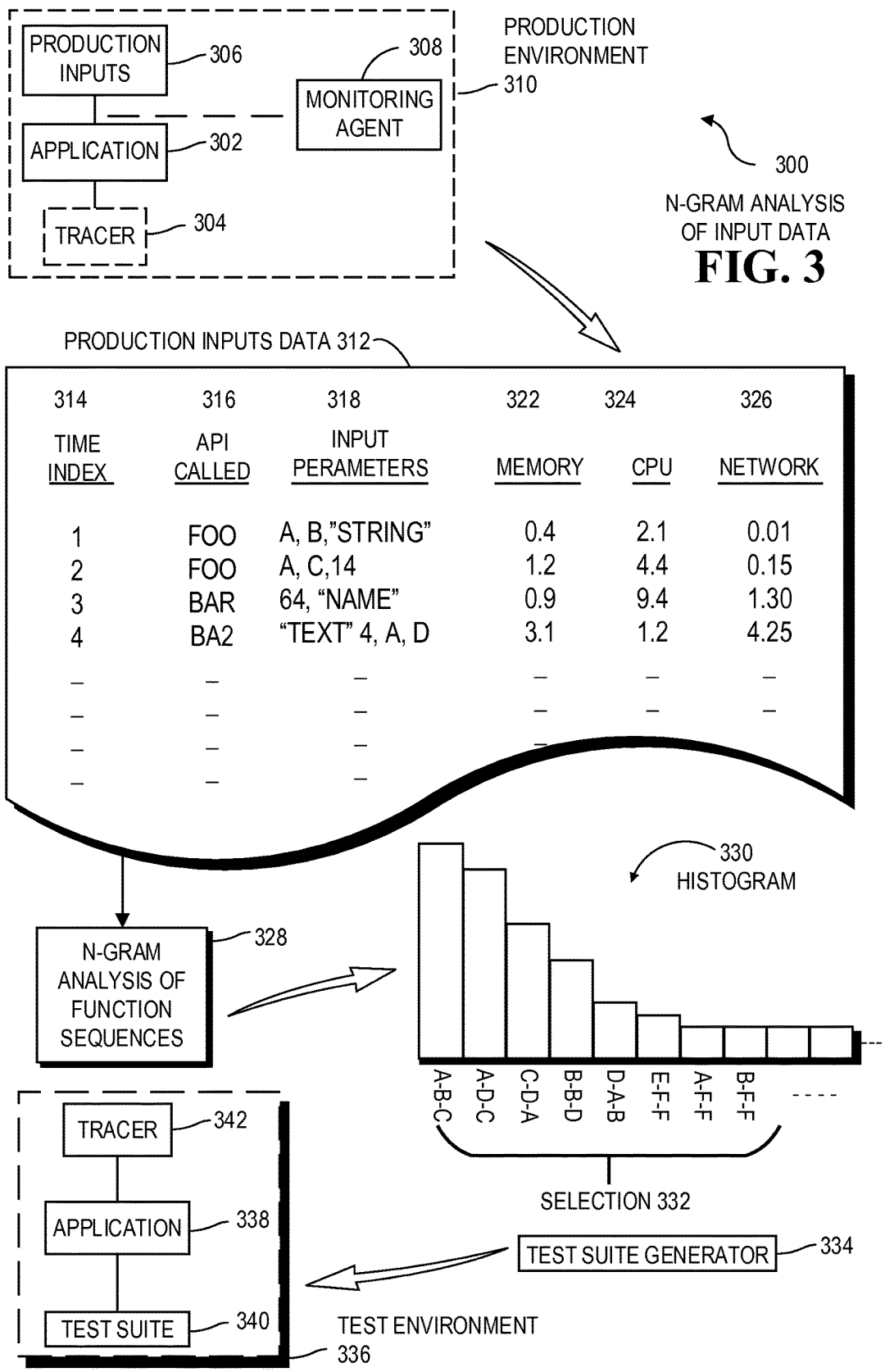
FIG. 3 is a diagram illustration of an embodiment showing a method for n-gram analysis of input data.

FIG. 3 is a diagram illustration of an embodiment 300 showing a mechanism to process input data using n-gram analysis. Embodiment 300 illustrates one sequence of analyzing data received by an application using n-gram analysis, then creating portions of a test suite based on the n-gram analysis. N-gram analysis of an input stream gives a characterization of the input stream, and can be used to generate test data that may accurately reflect the real world input to the application.

Embodiment 300 deals with characterizing the input stream using n-gram analysis, which is different than the analysis of sequences of functions as described in embodiment 100. When analysis of sequences of functions is performed, a tracer is used to instrument the application and gather observations regarding which function is executed in sequence. When analysis of input streams is performed, the input streams may be captured or tracked prior to sending the inputs to the application, and such a system does not impose as large an overhead on the application as a tracer may. In some cases, such monitoring may be performed with little to know overhead, while a tracer may impose overhead from 5% to 100% or more.

An application 302 may execute in a production environment 310. A tracer 304 or a monitoring agent 308 may capture the production inputs 306 to the application 302. An example of the output of the tracer 304 or monitoring agent 308 may be illustrated as production input data 312.

A monitoring agent 308 may be a mechanism that may intercept or monitor inputs that are transmitted to the application 302. Such an agent may operate with minimal or no interaction with the application 302 during execution. In some cases, the monitoring agent 308 may reside on a different device than one in which the application 302 executes. In one such example, a monitoring agent 308 may operate as part of a network router.

In some cases, an application 302 may be monitored by a combination of a tracer 304 and a monitoring agent 308. For the purposes of this specification and claims, the terms "monitoring agent" and "tracer" are considered synonymous when used independently of each other, but may represent external and internal instrumentation when used within context of each other. Internal instrumentation may be considered any type of data gathering mechanism that operates within an execution environment, and external instrumentation may be any type of data gathering mechanism that operates outside an execution environment in which a monitored application may execute.

The production input data 312 may represent inputs that are transmitted to the application 302 through an input mechanism of the application 302. An input mechanism may be an application programming interface, user interface, database interface, network interface, or any other input mechanism.

The production input data 312 may represent inputs that are received by a specific function or other subset of the application 302. In some such embodiments, the input data may be gathered by monitoring a function of interest within the application 302 using a tracer. Such embodiments may permit analysis of inputs to individual functions, as opposed to the application as a whole, which may assist in generating or evaluating unit tests for individual functions.

The production input data 312 illustrates merely one example of data that may be collected. A time index 314 identifies the sequence of observations. An observation may include the API or function called 316, the input parameters 318 transmitted to the function, as well as the resources consumed 320 of the function. The resources consumed 320 may include memory 322, CPU or processor resources 324, network resources 326, as well as other resources such as storage resources, peripheral resources, input/output resources, database resources, and resources from local and remote services.

An n-gram analysis 328 of the inputs may yield a histogram 330, which may show the various n-grams. The n-gram analysis 328 may analyze the input parameters 318 that are received by the application. In some cases, the n-gram analysis may group the inputs by the functions or API calls. Such cases may have generate a separate histogram 330 for each function that may have been called. In other embodiments, all of the input parameters 318 may be analyzed as a group, without regard to the functions that were called. In some embodiments, the function name 316 may be added to the input parameters 318 to form a function/input series, which may be analyzed using n-gram analysis.

The n-gram analysis may identify n-grams from the inputs to a given function in many different manners. In some cases, the inputs may be aggregated, categorized, or otherwise pre-processed prior to n-gram analysis. In some cases, n-grams may be identified from certain types of pre-processed inputs. In other cases, n-grams may be created from the input data itself, such as identifying n-grams from sequences of input data, for example.

The histogram 330 may represent frequency, resource consumption, or other metric applied to the n-grams. The histogram 330 may be merely one representation of the n-gram analysis output.

In one use scenario of the n-gram analysis, a selection 332 may be made of the sequences of input parameters. The selection 332 may be processed by a test suite generator 334 to create a test suite 340 that may exercise the application 338 in a test environment 336. A tracer 342 may capture observations when the test suite 340 exercises the application 338.

In the use scenario, the histogram 330 may contain the most often observed input parameter sequences for the application or one of the functions in the application. These sequences may reflect the ways the application or function was exercised in the production environment 310. By using these n-grams, a test suite 340 may exercise the application 338 in the ways the application will likely to be exercised in production, thereby creating a very representative test suite 340.

Figure 4:
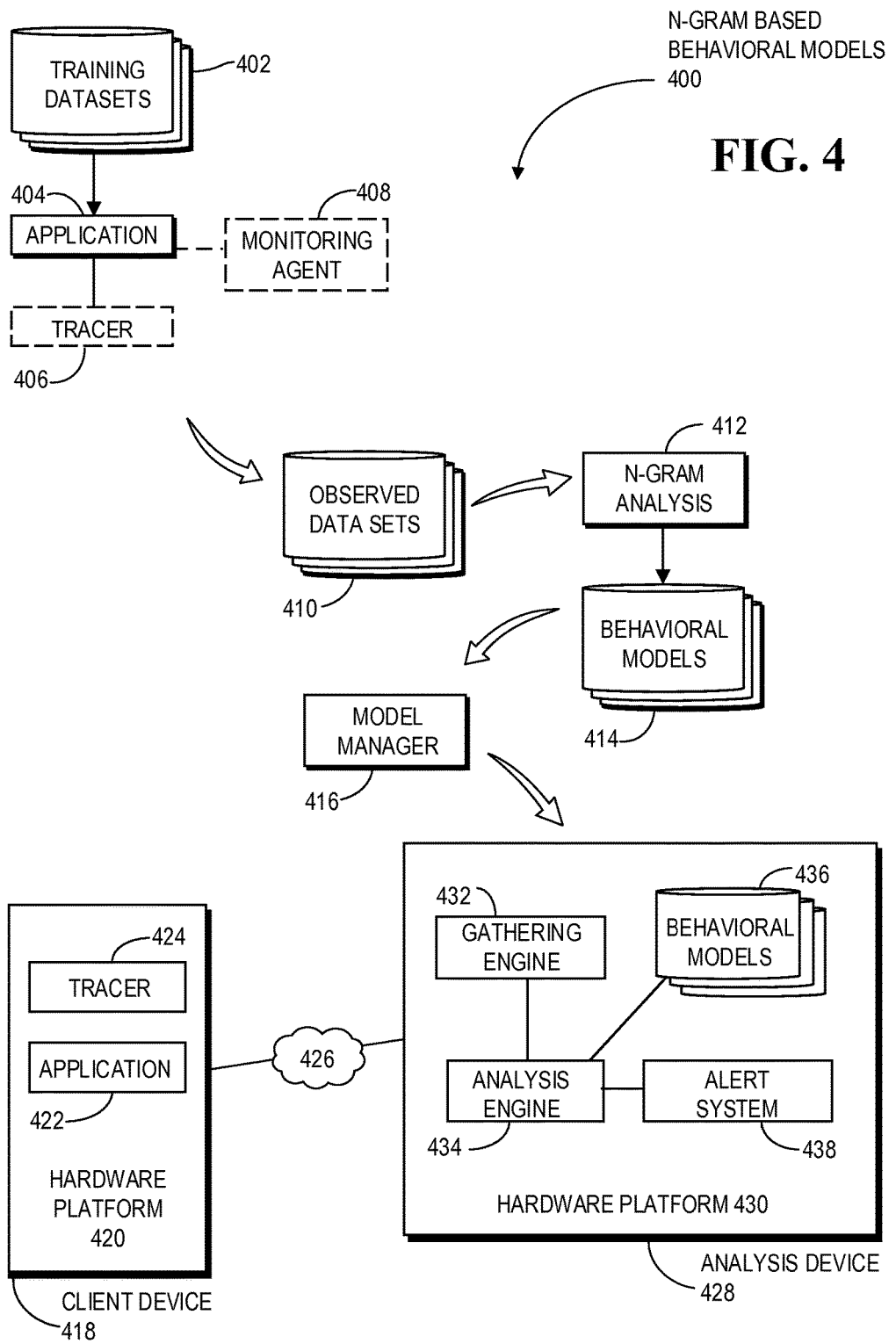
FIG. 4 is a diagram illustration of an embodiment showing a method for creating n-gram based behavior models.

FIG. 4 is a diagram illustration of an embodiment 400 showing a mechanism to use n-gram behavior models in a monitoring/alerting scenario. Embodiment 400 illustrates a mechanism for characterizing application behavior using either or both of n-gram analysis of function execution or inputs. Once the application is characterized, an alerting system may compare observations to the behavior models to determine if the observations match or deviate from the models.

Some embodiments may create multiple models using different training sets of data. The training sets may reflect known good behavior or known bad behavior, and may reflect very specific behaviors. When such training sets are used, an analysis system may be able to identify matches of or deviations from each of the various models, which may be useful in an alerting and monitoring scenario.

Training datasets 402 may be used to exercise an application 404. Observations may be made by a tracer 406 or a monitoring agent 408 to create observed datasets 410. In some cases, an observed dataset 410 may be created where the observations of both the tracer 406 and monitoring agent 408 may be combined.

Each of the observed datasets 410 may be analyzed using n-gram analysis 412 to create behavior models 414. The behavior models may reflect an expected behavior pattern of the application, its functions, inputs to the application, or other observations. In some cases, each n-gram reflecting a sequence of operations or inputs may be further combined with a resource usage to yield an expected behavior model that includes resource usage.

A model manager 416 may distribute the behavior models 414 to various analysis devices 428. In many cases, the analysis devices 428 may gather tracer data from devices executing the application in a production environment in which monitoring and alerting is desired.

The analysis device 428 may be connected over a network 426 to a client device 418. The client device 418 may execute the application 422 with a tracer 424. The tracer 424 may transmit observations to the analysis device 428.

The client device 418 may have a hardware platform 420, which may be similar to the hardware components 204 of embodiment 200. The analysis device 428 may operate on a hardware platform 430, which also may be similar to the hardware components 204. In some cases, the client device 418 may have a different hardware platform than the analysis device 428. In an example of such a case, the client device 418 may be a handheld mobile device while the analysis device may be a server computer operating in a datacenter.

The operations of the client device 418 and analysis device 428 are illustrated as two devices. In some cases, the various components of both the client device 418 and analysis device 428 may be combined into the same device.

The analysis device 428 may have a gathering engine 432, which may collect output from the tracer 424. In some cases, the gathering engine 432 may gather tracer data from many different client devices 418.

The gathering engine 432 may send tracer observations to an analysis engine 434, which may compare the observations to various behavior models 436. Based on the construction and any rules of a behavior model, an alert system 438 may generate alerts when an operational anomaly may be observed.

The alert system 438 may generate alerts, which may be as simple as entries in a log file or may involve transmitting emails, pager alerts, or other alerting mechanisms.

The behavior models 414 may reflect different operating states for the application 404. The analysis engine 434 may compare the observed behavior with one of the behavior models 414 to determine if the observed behavior is consistent or inconsistent with the behavior model. Examples of such analysis may include: when the observed behavior is consistent with a known bad behavior, an alert may be generated with a statistical confidence that bad behavior has occurred. When the observations are inconsistent with known good behavior, an assumption of bad behavior may be made.

In some cases, the behavior models may be generated for distinct subsets of expected behavior. For example, new users of an application may have a certain behavior profile while experienced users may have a different behavior profile. By comparing each user's behavior to the behavior models, an analysis engine 434 may identify the type of user.

In a simple example of such a system, the information may be used to customize the user's experience, such as adding help items to the inexperienced user or giving the experienced user detailed options that may be not be available to inexperienced users.

Figure 5:
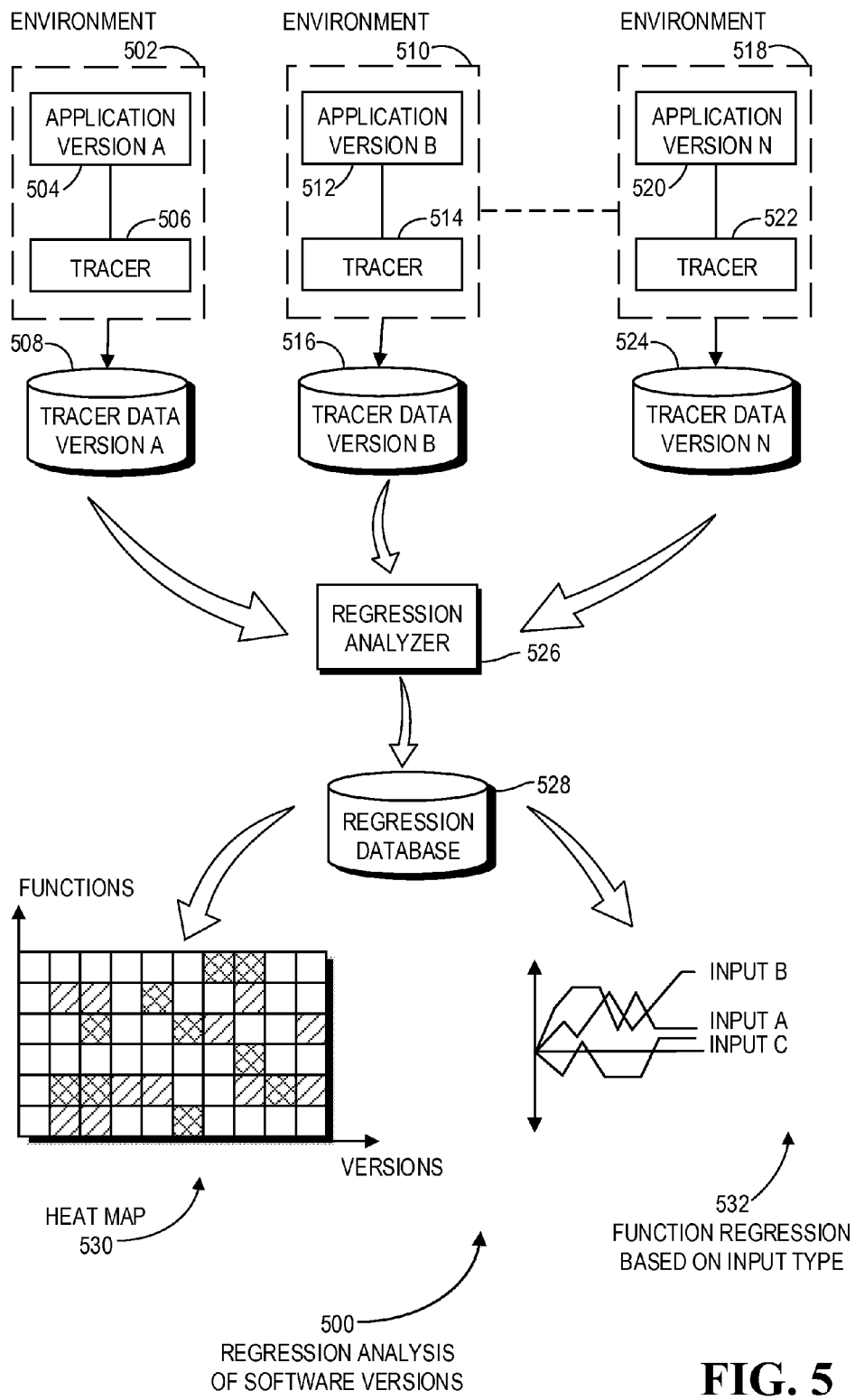
FIG. 5 is a diagram illustration of an embodiment showing a method for regression analysis of software versions.

FIG. 5 is a diagram illustration of an embodiment 500 showing regression analysis of software versions. Embodiment 500 illustrates a mechanism for comparing different versions of an application and providing output that represents the changes from version to version. Regression testing is a general term that may compare versions of an application. Regression testing may include performance regression testing that may determine whether a new version of an application improves or degrades performance, as well as improvements or degradation of the application feature set, usage behavior of the application in production, and other comparisons.

The regression analysis may compare different versions of an application. The differences between versions of an application may reveal performance improvements and regressions, which may help developers quantify their changes. As the changes between versions are understood, resources may be allocated to address any issues that may be uncovered.

Changes to an application may involve adding new features and improving or changing existing features. During the lifecycle of a software product, there is often a cycle of introducing new features, then addressing any new bugs that the new features may have. In an initial phase of a feature or application, the architecture of a new feature may be created, then bugs may be worked out of the feature as subsequent revisions are completed. Sometimes such phases may occur in a large software product, and sometimes such cycles may be observed on individual features of a product.

The versions of an application undergoing regression testing may be released or unreleased versions. Released versions of an application may be versions of a software application that may be shipped to customers or end users. Typically, such versions have some baseline level of testing performed prior to release. Unreleased versions may be builds that may be performed internally to a development team prior to releasing. Unreleased versions may often have many more bugs and flaws than released versions.

Regression testing of released versions of an application may generate data that may be useful to end users, customers, as well as a development team. The regression testing results may indicate any improvements that a customer may expect, and may help a customer be satisfied that the product is improving as desired.

Regression testing of unreleased versions of an application may be very useful to a development team. As each build of an application is evaluated and compared to the previous version, statistics, visualizations, and other output may help the team identify areas for improvement and celebrate successes.

A regression analyzer 526 may receive tracer data gathered from multiple versions of an application, then compare the versions. In an execution environment 502, application version A 504 may be executed with a tracer 506 to produce tracer data version A 508. Similarly, an application version B 512 may execute in an environment 510 with a tracer 514 to produce tracer data version B 516. An application version N 520 may execute in an environment 518 with a tracer 522 to produce tracer data version N 524.

The environments 502, 510, and 518 may be similar or dissimilar. In some cases, the various environments may be as identical as possible. Such cases may attempt to duplicate the same environment for each version of an application, with the understanding that performance metrics observed with each version may be directly comparable.

When the environments 502, 510, and 518 are dissimilar, a meaningful regression analysis may still be performed. In such embodiments, a larger sample size may be taken, which may include tracer data gathered from many devices. In some cases, tracer data may be gathered from many tens, hundreds, thousands, or even millions of devices. Such larger datasets may produce statistically meaningful comparisons between versions of an application.

The regression analyzer 526 may compare the tracer data gathered from each of the versions of the application and produce a regression database 528. The regression database 528 may contain analyzed data from which various visualizations may be made, such as a heatmap 530 and a function regression graph 532, which may be representative types of visualizations. Other reports and statistics may also be generated from the regression database 528.

The regression analyzer 526 may compare different versions of an application as a whole, on a function-by-function basis, some other grouping, or a combination of the above. When comparing application versions as a whole, one or more statistics or metrics may be used to represent each version. When comparing versions on a function-by-function basis, statistics for each function may be generated.

The applications 504, 512, and 520 may be complete applications or may be libraries, modules, functions, or other portion of a larger application. In some cases, the various environments may include a test suite that may exercise the application in a specific manner. Such test suites are generally designed to maximize code coverage on a line by line basis.

Figure 6:
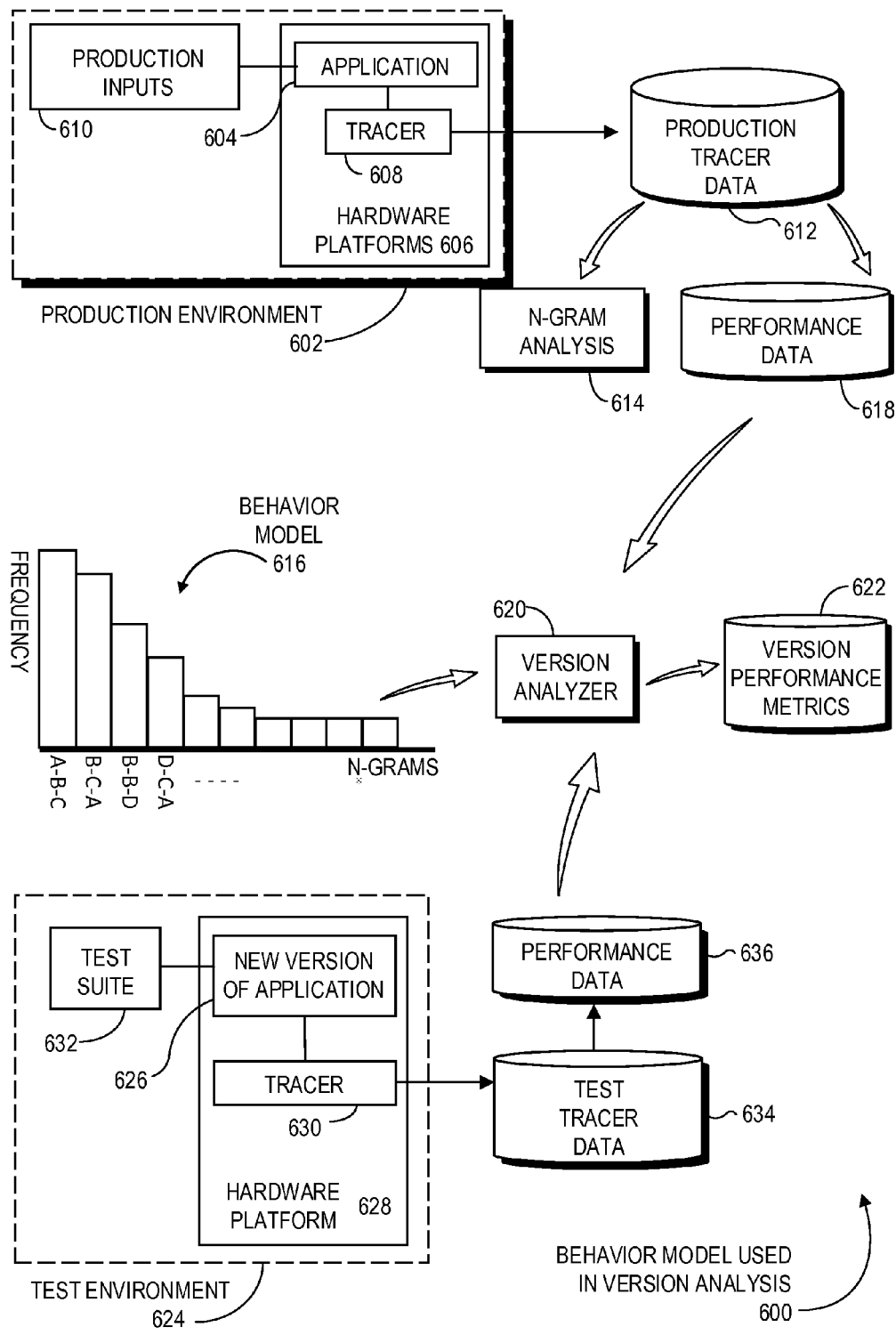
FIG. 6 is a diagram illustration of an embodiment showing a method for using behavior models in regression or version analysis.

FIG. 6 is a diagram illustration of an embodiment 600 showing a behavior model used in version analysis. A behavior model may be constructed of n-grams observed in production uses of an application, and the frequency of observations for the n-grams may weight performance metrics to generate an overall performance comparison of two versions of an application.

A behavior model 616 may represent the manners in which an application is used in production or the 'real world'. The production uses of the application may be observed by tracing the application as it is used in production conditions. In a production environment 602, the application 604 may be exercised on various hardware platforms 606. A tracer 608 may gather observations about the operations as the application 604 responds to production inputs 610. The observations may be stored in production tracer data 612.

The production environment 602 may vary with different applications. For applications that execute on server computers in a datacenter, the production environment 602 may be various datacenters and the production inputs may be application programming interface calls. In such environments, the hardware platforms 606 may be relatively similar and homogenous. For applications that execute on consumer devices, such as handheld mobile devices, game consoles, personal computers, or other devices, the hardware platforms 606 may be heterogeneous and widely varied. With such applications, the production inputs 610 may be direct user input to the application 604.

The production tracer data 612 may be a representative sample of operations performed by the application 604 and not every instance of every operation performed by the application 604. Various mechanisms may be used to sample the production operations of the application 604.

An n-gram analysis 614 of the production tracer data 612 may generate a behavior model 616. The n-gram analysis 614 may identify n-grams within the production tracer data 612. The n-grams may reflect functions executed by the application, inputs received by the application, or other sequences of items that may be observed in the data.

The behavior model 616 may include the n-grams and their frequency of observations. A count of each n-gram may be made and then normalized over the entire dataset, yielding a percentage of observations for each n-gram. The behavior model 616 may be used by multiplying the n-gram observation percentage by a performance measurement for the n-gram, then summing the results across all the n-grams.

The behavior model 616 may be quite large when many n-grams are observed. Typically, such models may have a long tail of n-grams with very few observations which do not contribute substantively to the overall model. In such cases, the behavior model may truncated by selecting a subset of n-grams that may represent some percentage of the total observations. The subset may represent 50%, 75%, 90%, 95%, 99%, or some other percentage of the total observations.

A version analyzer 620 may extract performance data 618 from production tracer data 612 and apply the behavior model 616 to create version performance metrics 622. The version analyzer 620 may determine a performance metric for a given n-gram, then multiply the n-gram's frequency percentage to create an n-gram performance metric. The sum of all n-gram performance metrics may yield an overall performance metric for the application.

The performance data 618 may include resource consumption observations. The resources being observed may include processor resources, memory resources, storage resources, network resources, peripheral resources, input/output resources, database resources, local and remote service resources, and other resources. The overall performance metric for an application may be generated using one or a combination of such resource consumption observations. In some cases, a heuristic, algorithm, or other mechanism may combine multiple resource consumption observations into a single statistic that may be represent a combined performance for a given n-gram.

Different versions of the application 604 may be compared by exercising a new version of the application 626 in a test environment 624. The new version of the application 626 may be exercised using a test suite 632 and a tracer 630 may gather performance observations as test tracer data 634. From the test tracer data 634, performance data 636 may be extracted for each of the various n-grams, then a performance statistics for the version may be generated using the behavior model 616 derived from production observations.

The comparisons of two different versions of an application using a single behavior model may apply different weights to performance observations based on how frequently those operations are observed. For very frequently used functions of an application, for example, an improvement in performance may be multiplied by the frequency of use, leaving a very large improvement in overall performance. For infrequently used functions, improvements in performance, no matter how large, may have little improvement in overall performance.

The behavior model 616 is a useful approximation of the way an application will be used in production, at least sufficiently to compare performance metrics between two versions. In some cases, a new version of an application may have a new feature or a different set of functionality than a previous version. In such cases, one would expect that users would change their behavior in response. However, the behavior model 616 may be used as a reasonable proxy for the expected behavior when the new behavior has not yet been experienced.

Figure 7:
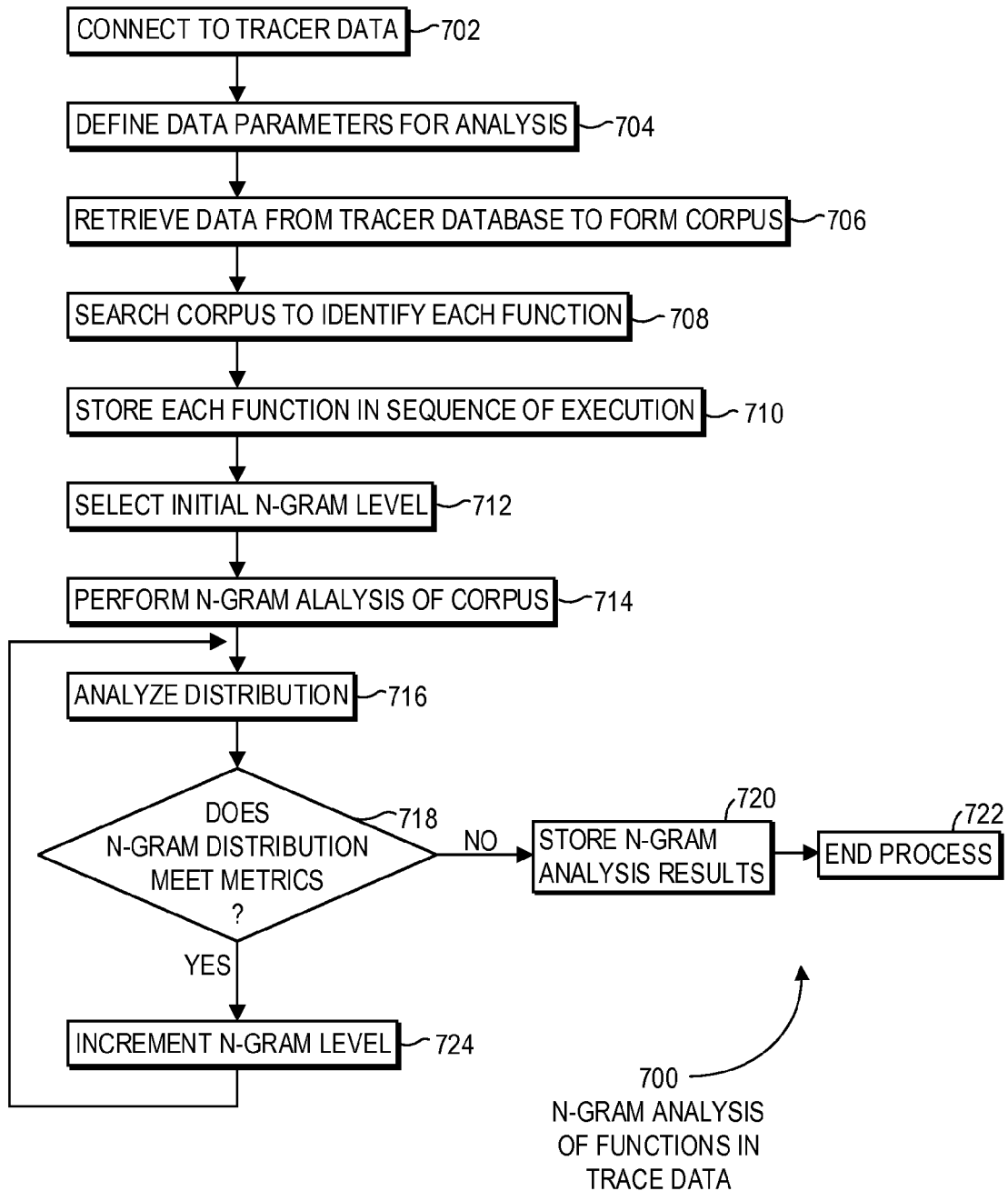
FIG. 7 is a flowchart illustration of an embodiment showing a method for performing n-gram analysis of functions in tracer data.

FIG. 7 is a flowchart illustration of an embodiment 700 showing a method for performing an n-gram analysis of functions observed in tracer data. Embodiment 700 may be one example of operations that may be performed in various n-gram analyses of tracer data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 700 illustrates one example of n-gram analysis, where the n-gram analysis may be performed against sequences of functions executed inside an application, library, module, or other executable code. The n-gram analysis may adjust the size of the n-gram to find an n-gram model that gives meaningful results.

A connection may be made to a tracer database in block 702.

The data parameters for analysis may be defined in block 704. The data parameters may be identifiers, search keys, or other definitions that define tracer data to analyze. In many cases, a tracer dataset may include trace data from various sources, some of which may be from monitoring an application in production or while under test.

The data may be retrieved from a tracer database in block 706 to form a corpus for analysis. A search may be performed of the corpus in block 708, and the functions may be stored in sequence of execution in block 710.

Tracer data may include sequences of functions that were compiled from different execution threads. In some such cases, the functions belonging to individual threads may be identified and grouped into sequences by threads. When functions are grouped by threads, the n-grams may be more insightful than when functions from many threads are sequenced by timestamp only.

An initial n-gram level may be selected in block 712. An n-gram level may refer to the number of elements in an n-gram. For example, a bi-gram may be an n-gram with two elements in sequence, a tri-gram may be an n-gram with three elements in sequence. A 4-gram, 5-gram, or 6-gram may be an n-gram with 4, 5, or 6 elements in sequence, respectively.

An n-gram analysis of the corpus may be performed in block 714. An n-gram analysis may traverse the corpus and identify each n-gram within the corpus. When sequences are identified in individual threads of execution, the n-grams may be identified within each thread.

A count of the number of observations of each n-gram may be kept. The count may be normalized by dividing the count for each n-gram by the total number of n-grams observed. When such an operation is performed, the n-gram frequency may be a percentage of the whole.

The distribution of the n-grams may be analyzed in block 716. The distribution may be analyzed by applying a heuristic, algorithm, or other analysis to determine if the n-gram distribution represents the data. An example of such an analysis may attempt to find an n-gram level where the n-gram with the highest frequency is some multiple of the median n-gram frequency. For example, a well formed n-gram analysis may have the highest frequency n-gram be at least 10 times the frequency of the median n-gram.

When the n-gram distribution meets a metric in block 718, the n-gram analysis may be stored in block 720 and the process may end in block 722.

When the n-gram distribution does not meet a metric in block 718, the n-gram level may be incremented in block 724 and the process may return to block 714.

Figure 8:
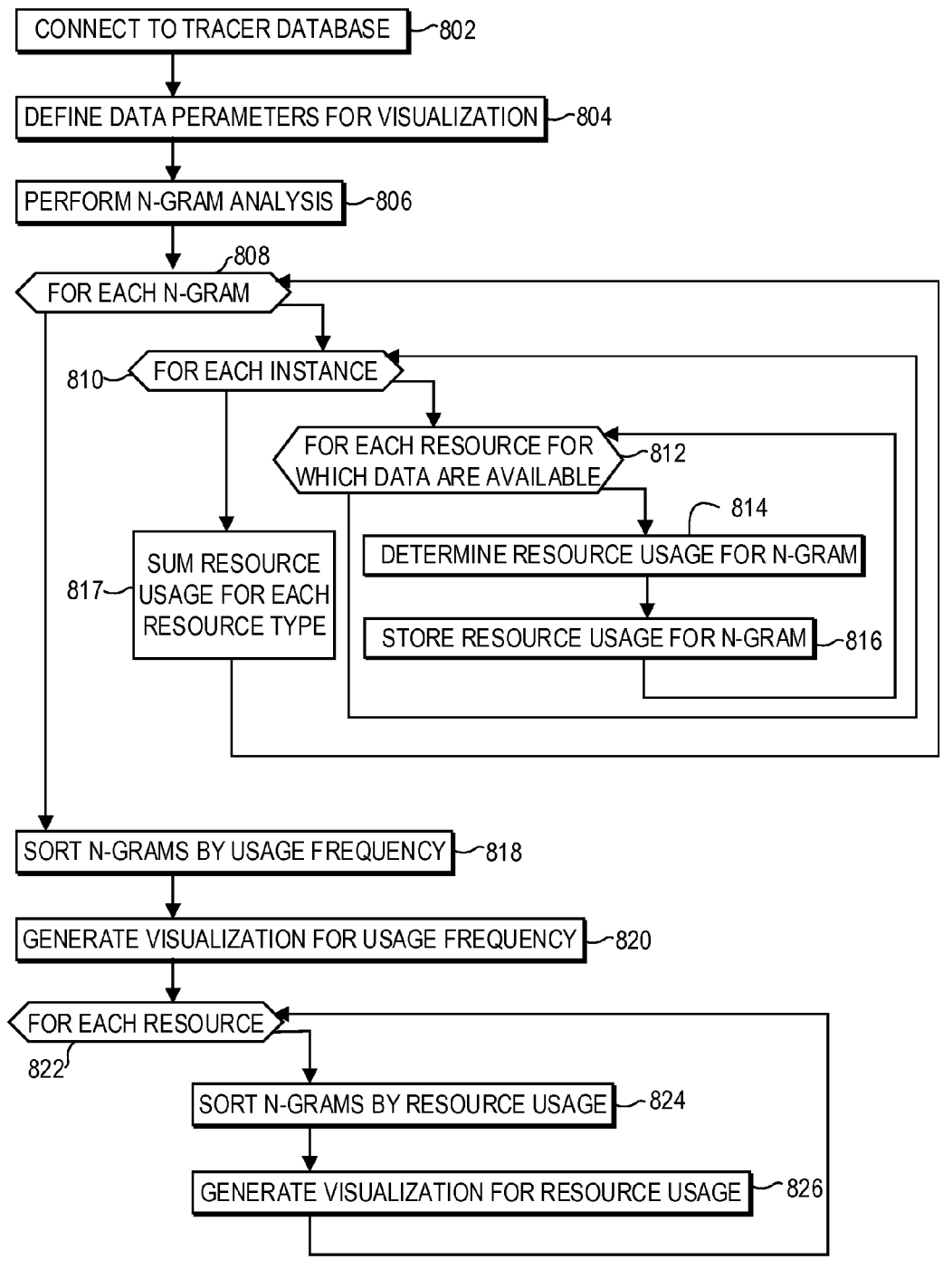
FIG. 8 is a flowchart illustration of an embodiment showing a method for generating n-gram visualizations.

FIG. 8 is a flowchart illustration of an embodiment 800 showing a method for generating n-gram visualizations generated from tracer data. Embodiment 800 may be one example of operations that may be performed to analyze and visualize tracer data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 800 is merely one example of how to apply n-gram analyses to quantify performance data for an application. The embodiment may produce two graphs: one with just the n-gram frequency and another with the performance characteristics of the n-grams.

A connection may be made to a tracer database in block 802 and the parameters for a visualization may be defined in block 804. The parameters may define which data are to be visualized, such as the monitored device, date range, performance metrics, or other options for the visualization. An n-gram analysis may be performed against the selected corpus of data in block 806. An example of such an analysis may be illustrated in embodiment 700.

For each n-gram in block 808, each instance of the n-gram may be evaluated in block 810. For each instance of each n-gram, the various monitored resources may be evaluated in block 812. A resource usage for the n-gram may be determined in block 814. The resource usage may be stored in block 816. After processing each resource in block 812 and every instance in block 810, the resource usage for all the instances may be summed in block 817.

After processing each n-gram in block 808, the n-grams may be sorted by frequency in block 818. A visualization may be generated from the sorted n-grams in block 820.

Visualizations for each of the types of resources may be generated by processing each resource in block 822. The n-grams may be sorted by resource usage in block 824 and a visualization may be created in block 826. In some cases, the resource usage for a specific n-gram may be multiplied by the frequency of the n-gram. Such cases may reflect a weighting of the resource usage based on the frequency that the n-gram is exercised.

Figure 9:
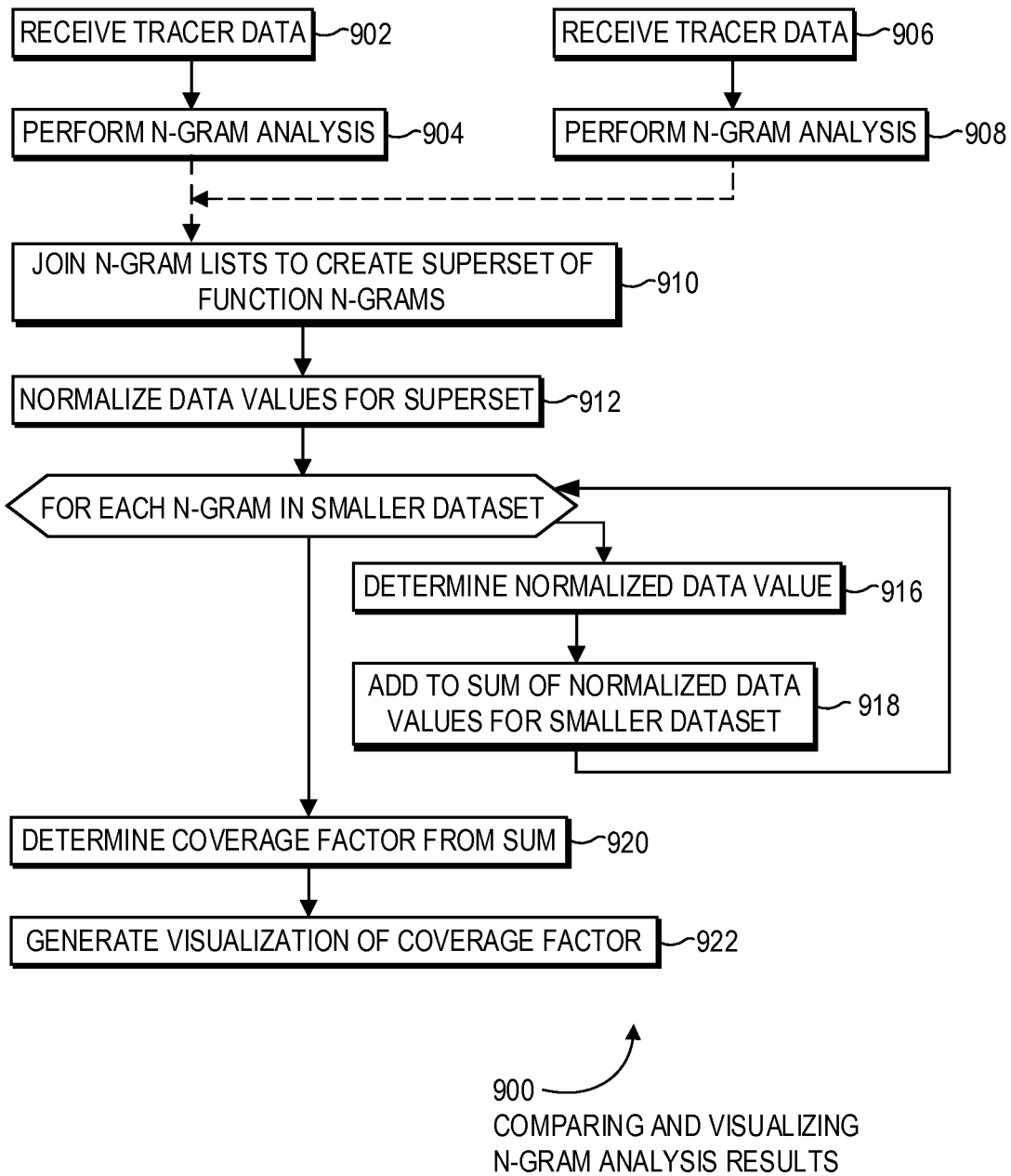
FIG. 9 is a flowchart illustration of an embodiment showing a method for comparing and visualizing n-gram analysis results.

FIG. 9 is a flowchart illustration of an embodiment 900 showing a method for comparing and visualizing n-gram analysis results. Embodiment 900 may be one example of operations that may be performed to compare test suite coverage to actual production data, among other uses.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 900 may illustrate one use case for n-gram analysis, where the coverage or overlap of test data may be compared to actual production observations of an application. The production observations may be analyzed using n-gram analysis to determine a frequency of observations of the n-grams. The test data may be analyzed to determine which n-grams were exercised. A coverage factor may be calculated by determining the n-grams that were exercised and summing the frequency of those n-grams from the production usage data.

Tracer data may be received in block 902 and an n-gram analysis performed in block 904. A second set of tracer data may be received in block 906 and an n-gram analysis may be performed on that set of data in block 908.

In one use case, one of the tracer datasets may be from a production use of an application, while the other dataset may be gathered while observing a test suite exercising the application. The comparison of the two datasets may yield a coverage factor that may be a percentage of coverage of the production uses of the application by the test suite.

Such a number may be useful to generate test situations that adequately cover the production used of an application, and may be a more useful measurement than the classic 'code coverage' metrics that generally measure tested lines of code verses total lines of code. The coverage metric created through n-gram analysis may give a metric based on actual production uses of the application. A high coverage metric using such a method indicates that the test suite exercises the operations most often seen in production.

In another use case, one of the datasets may reflect the usage of the application in one environment, situation, or version of the application, and the other dataset may reflect the usage of the application in a different environment, situation, or version. By comparing the two versions or situations of the application, a user may be given a useful numerical representation of differences or degree of similarity between the situations.

The n-grams from both sets of tracer data may be aggregated in block 910 to create a superset having all of the n-grams. The n-grams may have associated frequency values that may be normalized to a percentage value based on the entire dataset. When combined with the second dataset, those percentages may be normalized again in block 912 to produce an aggregated dataset.

In some cases, the operations of blocks 910 and 912 may be omitted. In such cases, the coverage factor may reflect the intersection of the second dataset on the first, as opposed to the intersection of the datasets with respect to the union of both datasets.

Each n-gram in the smaller dataset may be analyzed in block 914. For each n-gram, the normalized data value 916 may be determined and summed in block 918.

The coverage factor may be determined in block 920 from the sum of the data values in block 918.

A visualization may be produced in block 922.

Figure 10A:
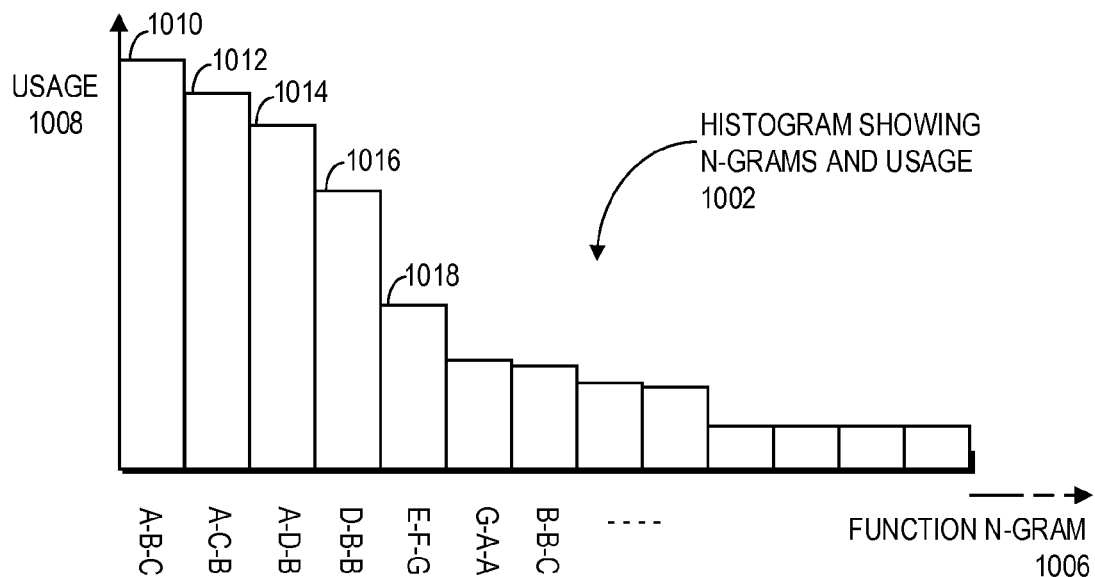
FIG. 10A is a diagram illustration of an embodiment showing an example histogram showing n-grams and usage.
Figure 10B:
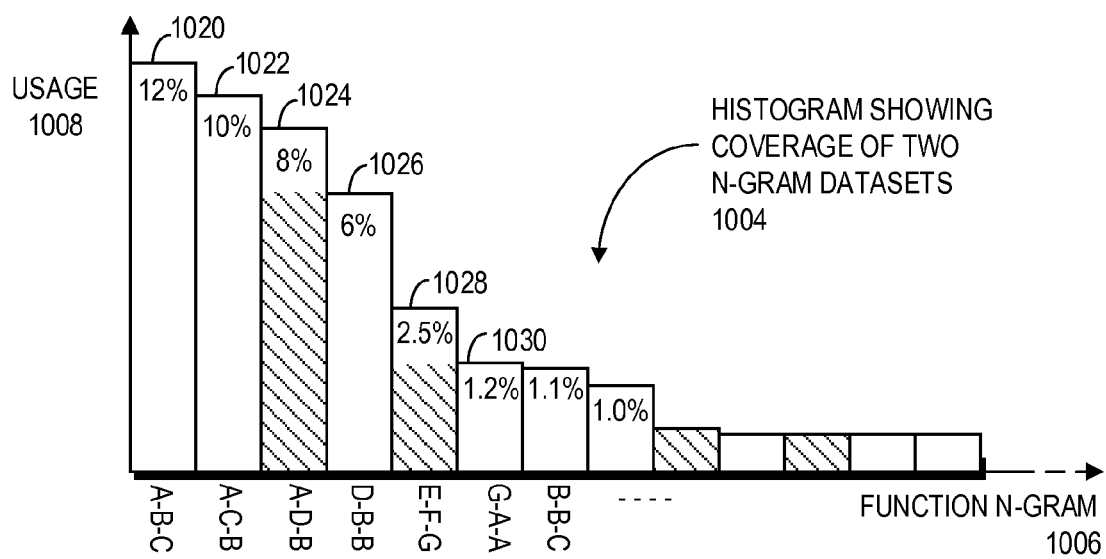
FIG. 10B is a diagram illustration of an embodiment showing an example histogram coverage of two n-gram analyses.

FIGS. 10A and 10B illustrate example visualizations that may be derived from n-gram analysis. Histogram 1002 may show n-grams and their usage, while histogram 1004 may show coverage of two n-gram datasets. Both histograms may show a sorted set of n-grams 1006 versus the usage 1008 or frequency of observation of the n-gram.

The n-grams may reflect function sequences or input sequences observed from tracer data. For example, element 1010 may represent the observed sequence A-B-C, element 1012 may represent A-C-B, element 1014 may represent A-D-B, and so forth for elements 1016 and 1018. The capital letters may represent functions executed in sequence, inputs received in sequence, or some other sequence observed in tracer data. In the example of embodiment 1000, tri-grams are used as the representative n-grams, but only for illustration purposes.

The histogram 1002 may illustrate the most frequently observed n-grams. Those n-grams that are most frequently used represent a bulk of the observations in the trace data.

Such information may be useful to identify which operations are most frequently used, and such operations may therefore justify additional investment. At the same time, those n-grams with very little use may not justify additional investment.

The histogram 1004 may illustrate the same dataset as histogram 1002 but where coverage of a second dataset is illustrated on top of the first. Histogram 1004 is also illustrated as having frequency percentages in some elements of the graph.

Elements 1020, 1022, 1024, 1026, 1028, and 1030 are identified. However, only elements 1024 and 1028 are highlighted in the illustration. The highlighting may indicate that those elements were found in a second tracer dataset. From the illustration, elements 1020, 1022, 1026, and 1030 were not found in the second dataset. From the visualization, a user can view the coverage by comparing the highlighted and non-highlighted elements. When there is 100% coverage, all of the elements would be highlighted.

Figure 11:
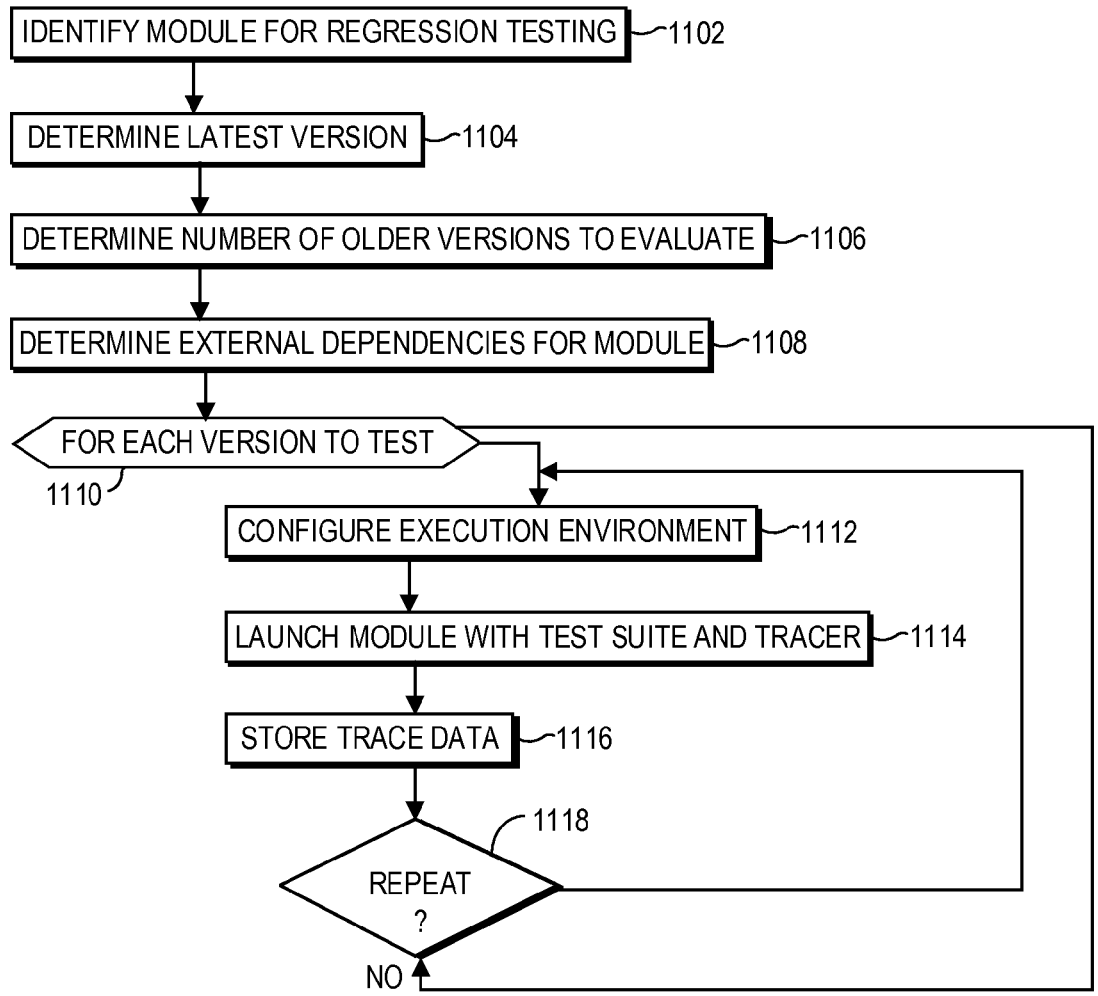
FIG. 11 is a flowchart illustration of an embodiment showing a method for executing regression tests.

FIG. 11 is a flowchart illustration of an embodiment 1100 showing a method for executing regression tests. Embodiment 1100 may be one example of operations that may be performed to determine any improvements or regression between versions of an application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 1100 may illustrate one mechanism for executing regression tests. Embodiment 1100 may be fully automated, and may be triggered by an event, such as a push to a repository or as part of a build process.

The example of embodiment 1100 may illustrate regression analysis as applied to a module or library. The method may identify the dependencies of the module and configure an execution environment to test the module.

The execution environment used to perform a test may be a controlled environment that may be replicable from one test to another. Such an environment may be useful to compare results gathered from executing different versions of a module or application at different times. In a controlled environment, the execution environment may be controlled to be as identical as possible from one test to the next. Such embodiments may use the same memory, processor, network connection, and other hardware components. The software components may also be duplicated, as well as test input data streams and other elements of a test. Such embodiments may operate under the assumption that differences between versions may be due to differences in the application or module under test, rather than differences in the test environment.

The execution environment may not be rigorously controlled in some cases. In such embodiments, tests may be performed many times on many different hardware platforms. The test results may be aggregated and compared to similar large numbers of datasets collected with a second version of an application or module. Embodiments with such large datasets may be more difficult to collect, analyze, and manage than embodiments where fewer samples may be taken.

A module may be identified for regression testing in block 1102. In the example of embodiment 1100, a module, library, or other software component may be illustrated. The same concepts may be applied to applications, services, or other executable code.

The latest version of the module may be determined in block 1104, and the number of older versions may be identified in block 1106.

A regression test may be performed on multiple versions on a single execution environment. By testing different versions of a module on the same execution environment, a direct version-to-version comparison may be made, even when previous regression tests were performed on a different execution environment. Tests that may have been performed on different execution environments may not be directly comparable.

The external dependencies of the module may be determined in block 1108. The external dependencies may include other modules upon which the module under test depends, as well as test suites and input data used by the test suites.

For each version of the module to test in block 1110, the execution environment may be configured in block 1112. The configuration may include configuring hardware components, installing software components, readying any external services, or other configuration operations. The module may be launched with a test suite in block 1114 with a tracer. The data may be collected and stored in block 1116. If the test may be repeated in block 1118, the process may loop back to block 1112, otherwise the process may return to block 1110 to test another version.

A regression test may be performed multiple times for each version of a module. Repeated test results may provide a more statistically valid set of results that may be compared to results from other versions of the module.

Figure 12:
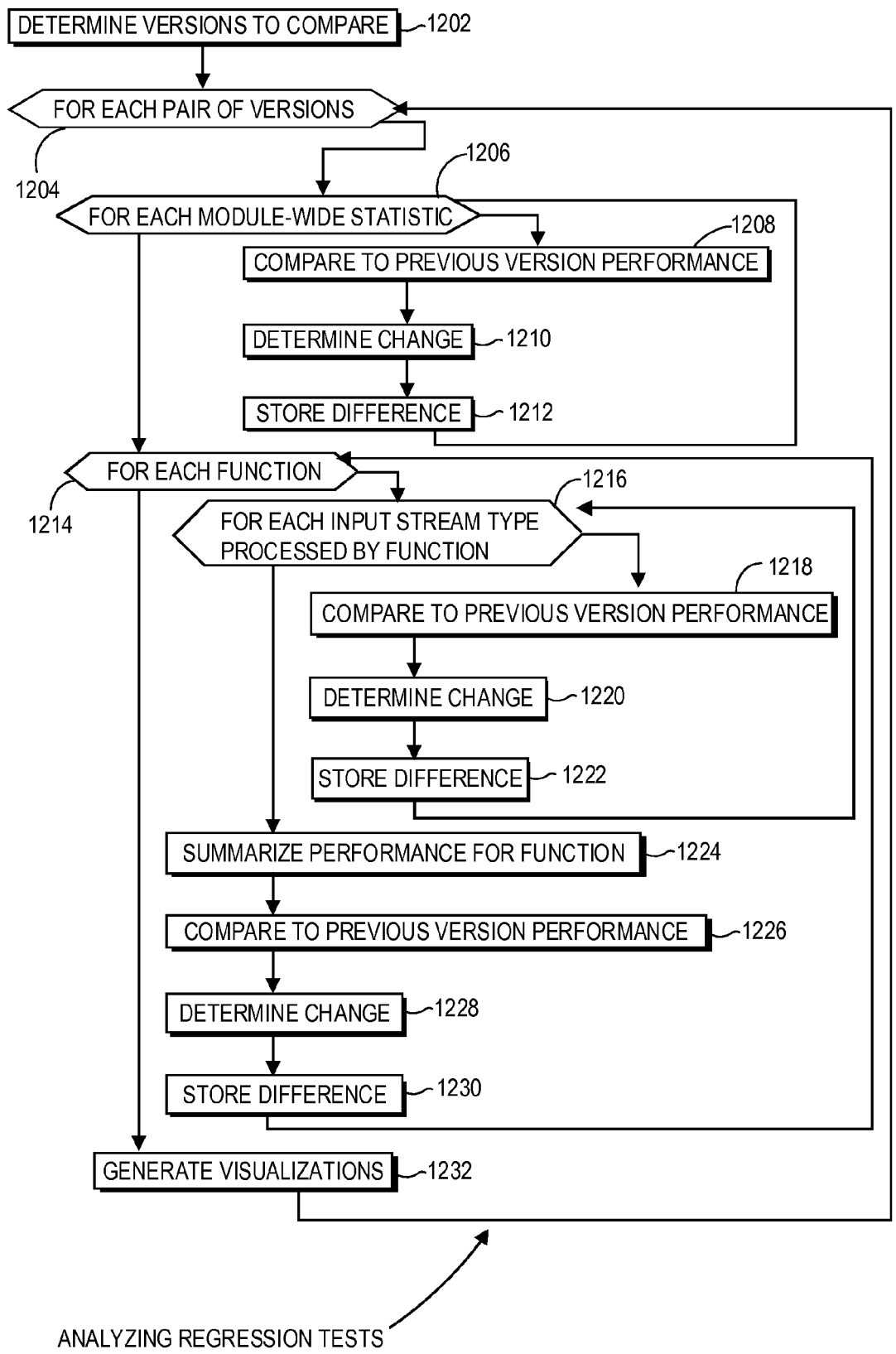
FIG. 12 is a flowchart illustration of an embodiment showing a method for analyzing regression tests.

FIG. 12 is a flowchart illustration of an embodiment 1200 showing a method for comparing regression test results. Embodiment 1200 may be one example of operations that may be performed to compare the results of regression tests, such as the regression tests illustrated in embodiment 1100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 1200 may illustrate one method by which regression test results of a module or other software component may be determined. Two or more versions of a module may be compared on a function-by-function basis, as well as module-wide statistics. The resulting visualizations may give a developer actionable feedback that may show improvements or regression for the module.

The versions to analyze may be determined in block 1202. Each pair of versions may be analyzed in block 1204.

For each pair of versions in block 1204, each module-wide statistic may be analyzed in block 1206. The module-wide statistics may be any performance or operation statistic that may be gathered for the module as a whole. The comparisons may be made in block 1208 and any differences may be determined in block 1210. The difference may be stored in block 1212.

Each function may be evaluated in block 1214.

Different types of input streams may be input to a given function. The different types of input streams may be designed to test different aspects of the module. Examples of different types may include input streams that perform various performance tests, functional tests, unit tests, system tests, or other types of input streams that exercise different portions of the module.

The performance of the two versions may be compared in block 1218, the changed may be determined in block 1220, and the different stored in block 1222. After analyzing all of the input streams in block 1216, the performance of a function may be summarized in block 1224. In some cases, certain types of input streams may be excluded, combined, aggregated, or otherwise processed to determine an overall performance comparison for a specific function. A comparison to previous version may be made in block 1226, the differences determined in block 1228, and the result stored in block 1230. After examining each function in block 1214, various visualizations may be generated in block 1232.

Figure 13A:
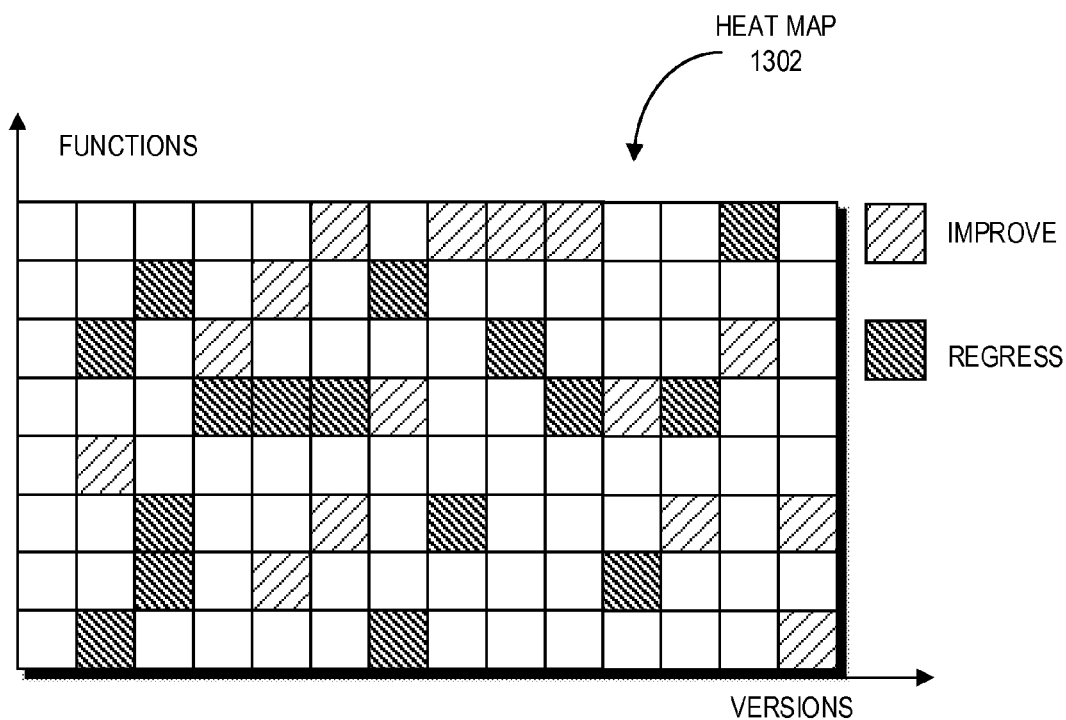
FIG. 13A is a diagram illustration of an embodiment showing an example heatmap.
Figure 13B:
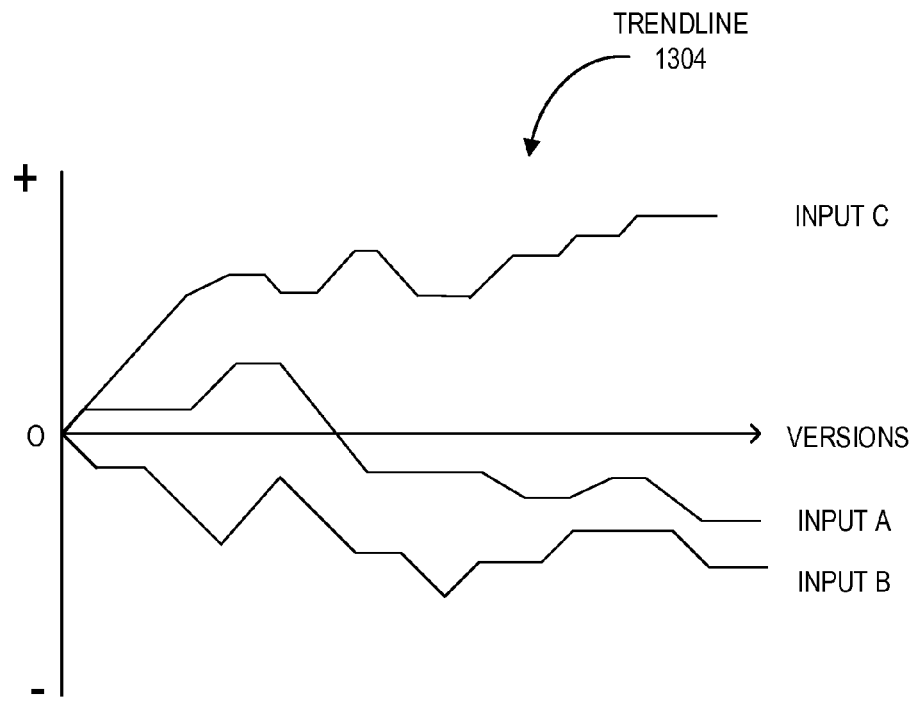
FIG. 13B is a diagram illustration of an embodiment showing an example trendline diagram.

FIGS. 13A and 13B are example illustrations of different visualizations that may be created from regression analysis. These examples are merely two ways that regression analysis may be illustrated to a user. Many other examples may also be used.

A heatmap 1302 may show the versions of a module in the horizontal scale, with the various functions within the module in the vertical axis. The color of the blocks may show improvements or regression in performance for the given function. Such an illustration may show the performance changes of the various functions as different versions have been produced.

A treadline 1304 may show the performance improvements or regressions with different types of input. The versions of the module are shown increasing to the right in the horizontal scale. The various lines show the increase or decrease in performance for a particular input.

Figure 14:
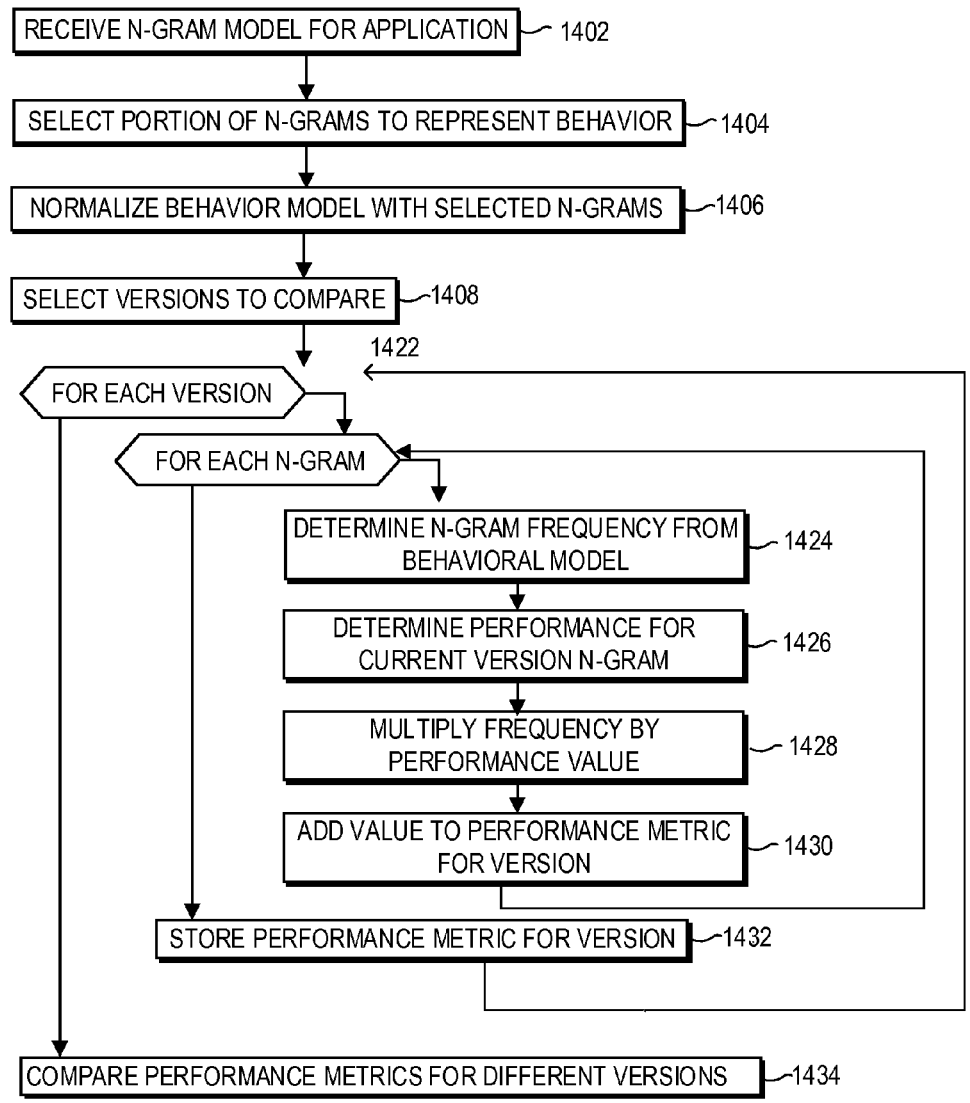
FIG. 14 is a flowchart illustration of an embodiment showing a method for using behavior models for version comparisons.

FIG. 14 is a flowchart illustration of an embodiment 1400 showing a method for comparing versions of an application using a behavior model. Embodiment 1400 may be one example of operations that may use n-gram analysis as a behavior model to weight performance factors for different versions of an application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 1400 illustrates a method for evaluating the performance of different versions of executable code. In the example of embodiment 1400, an application is used as the example executable code. The same process may be applied to modules, libraries, and other executable code elements.

A behavior model may be built from n-gram analysis of production observations of an application. The production observations may be a representative sample of the functions, inputs, or other behavior of the application. The n-gram analysis may identify n-grams in these data and determine the frequency of the n-gram in the observations.

The distribution of the n-gram frequencies may be a weighting factor that may be multiplied by a performance metric observed for the n-gram. Those n-grams with higher number of observations may have more weight in determining an overall performance metric for a version of the application.

A subset of the n-grams may be selected to represent the behavior of the application. The subset may be the n-grams that represent a certain percentage of the total observations. Such a percentage may be at least 50%, 75%, 90%, 95%, 99%, or some other percentage.

The same behavior model may be used for comparing two different versions of an application. The behavior model may be derived from observations of a first version of an application, but may be used to compare the performance of a new version of the same application where a new behavior model is not available. The behavior model of a current, production version of the application may be substituted as an expected behavior model for the purposes of estimating performance differences.

An n-gram model of an application may be received in block 1402. The n-gram model may include n-grams identified from tracer data, along with the frequencies that each of the n-grams were observed in the tracer data. In many cases, the n-gram model may have been constructed from production observations of an application.

A portion of the n-grams may be selected in block 1404. In many cases, n-gram models may produce a relatively small number of n-grams with high frequency, and a long tail of n-grams with very small frequency of observations. By selecting a subset of n-grams that represent a large portion of the observations, the long tail of rarely observed n-grams may be disregarded from the behavior model with little effect on the calculated overall performance metric.

The behavior model may be normalized in block 1406 after selecting the subset of n-grams in block 1404. The normalization process may assign percentages to the n-grams in proportion to the observation frequency such that the sum of the percentages equals 100%. With such a model, the normalized percentage may be multiplied by the performance metric to generate an overall score for the version.

The versions to compare may be selected in block 1408. In many cases, one of the versions may be the version from which the n-gram model was derived, although in other cases, both of the versions being compared may be different from the version from which the n-gram model was derived.

For each version in block 1420, each n-gram may be evaluated in block 1422. An n-gram frequency may be determined from the behavior model in block 1424.

The performance of an n-gram may be determined from tracer data for the current version of the n-gram in block 1426. In some cases, the tracer data may provide performance data for each individual function. In order to determine a performance metric for an n-gram representing a set number of functions, the performance metrics of each of the functions in the n-gram may be summed.

The performance metric may be multiplied by the n-gram frequency in block 1428. The n-gram frequency may be given in a normalized percentage as described above. In some cases, the n-gram frequency may be a raw frequency count. In such cases, the performance metric may be normalized in some other manner.

The weighted performance value for the n-gram may be added to a performance metric for the version in block 1430. After analyzing all of the n-grams in the behavior model, the performance metric of the version may be stored in block 1432.

After generating a performance metric for each version in block 1420, the performance metrics may be compared in block 1434. In many cases, the performance metrics may be visualized. One example of a visualization may chart the performance metrics for successive versions on a graph or chart.

Figure 15:
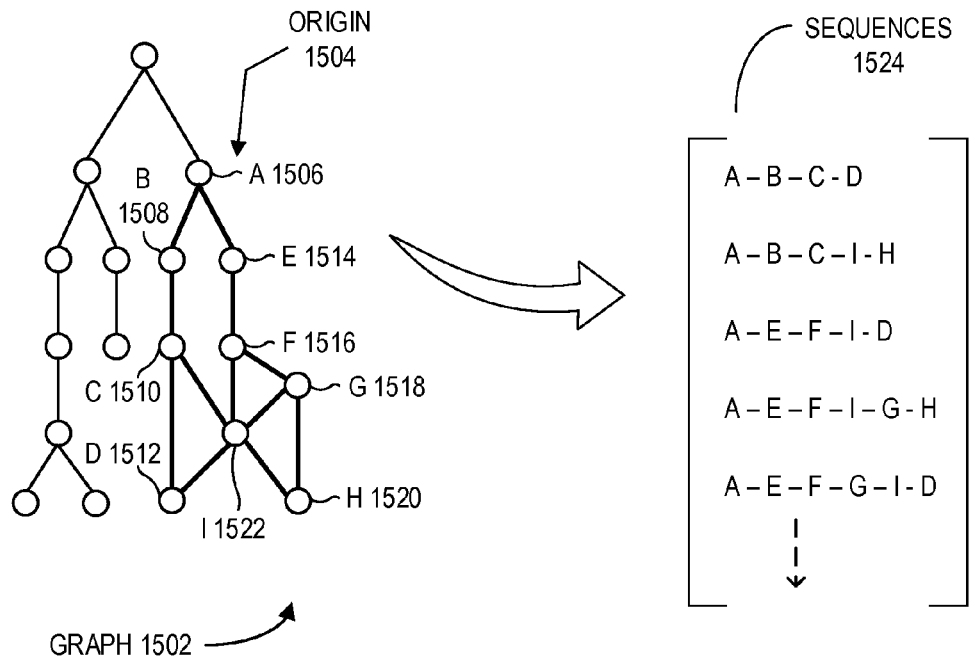
FIG. 15 is a diagram illustration of an embodiment showing operations for generating a behavior model from origin or exit sequences.
Figure 15:
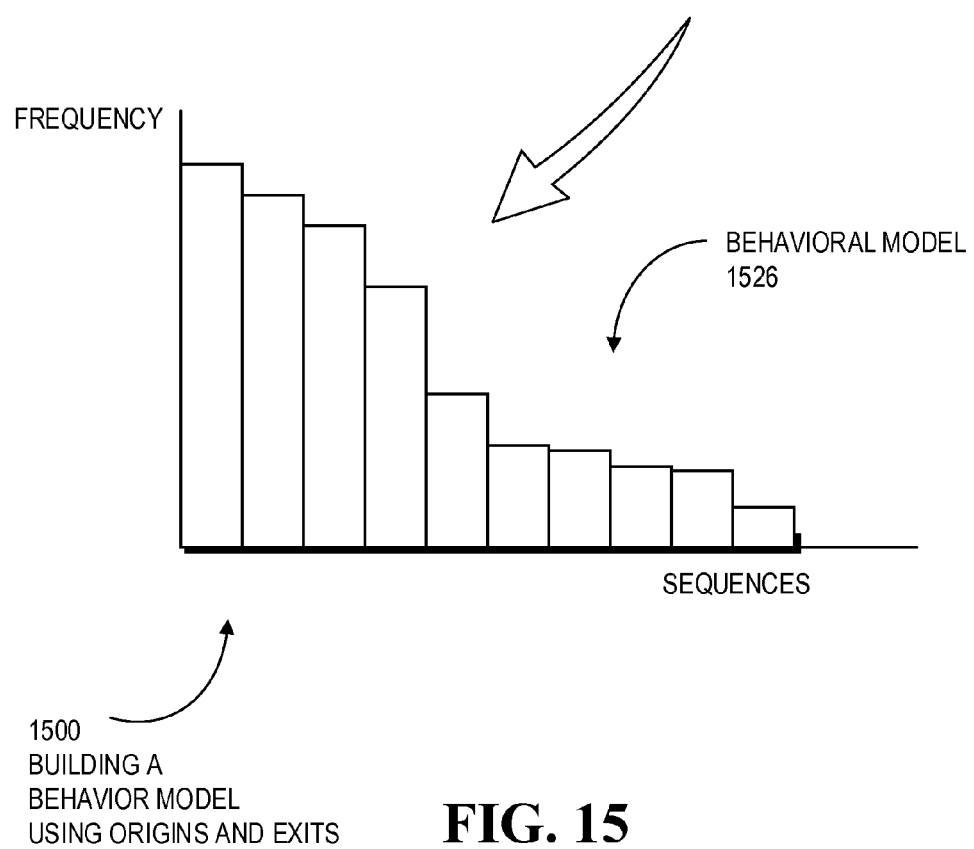

FIG. 15 is a diagram illustration of an embodiment 1500 showing a behavior model that may be built using origins and exits. An origin or an exit may be any location of interest within an application. Tracer data that include a desired origin or exit may be identified and a behavior model may be constructed from the sequences.

The sequences identified from the tracer data may be analyzed with or without n-gram analysis. In some cases, the sequences may be analyzed as a whole, and in some cases, sequences of different lengths may be analyzed together. In other cases, n-gram analysis may be performed on the subset of tracer data meeting the origin and exit definitions.

A graph 1502 may represent the execution flow of an application. The graph 1502 may represent application flow from top to bottom, where the top The graph 1502 may illustrate a subset of tracer data that may begin at an origin 1504. When the origin 1504 is selected, a behavior model may be generated from the sequences observed starting at the origin 1504.

The origin 1504 may represent node A 1506. A sequence of operations may be observed as node A 1506, node B 1508, node C 1510, ending at node D 1512. Another sequence may be node A 1506, node E 1514, node F 1516, node G 1518, ending at node H 1520. Still another sequence may be node A 1506, node E 1514, node F 1516, node G 1518, node I 1522, and ending at node H 1520. There may be many more sequences from the data.

The sequences 1524 may represent a list of the sequences observed from the tracer data. The list of sequences 1524 may represent a subset of a larger set of tracer data that may be collected for the entire application.

The origins may define a filter or limitation that may be used to select execution sequences from a tracer database. Exits may be similarly used to select execution sequences of interest. An origin definition may be the beginning of a sequence of interest, while an exit may define the end of such a sequence. In some cases, a user may select only an origin without selecting an exit. Sometimes, a user may select only an exit without selecting an origin, and still other cases, a user may select both an origin and exit.

The length of the sequences 1524 may vary in some cases. In such cases, the behavior model 1526 may include frequency measurements of different length sequences. In some cases, an n-gram analysis may be performed on the sequences 1524 and a behavior model 1526 may include frequency analysis of n-grams of the same sequence length.

Figure 16:
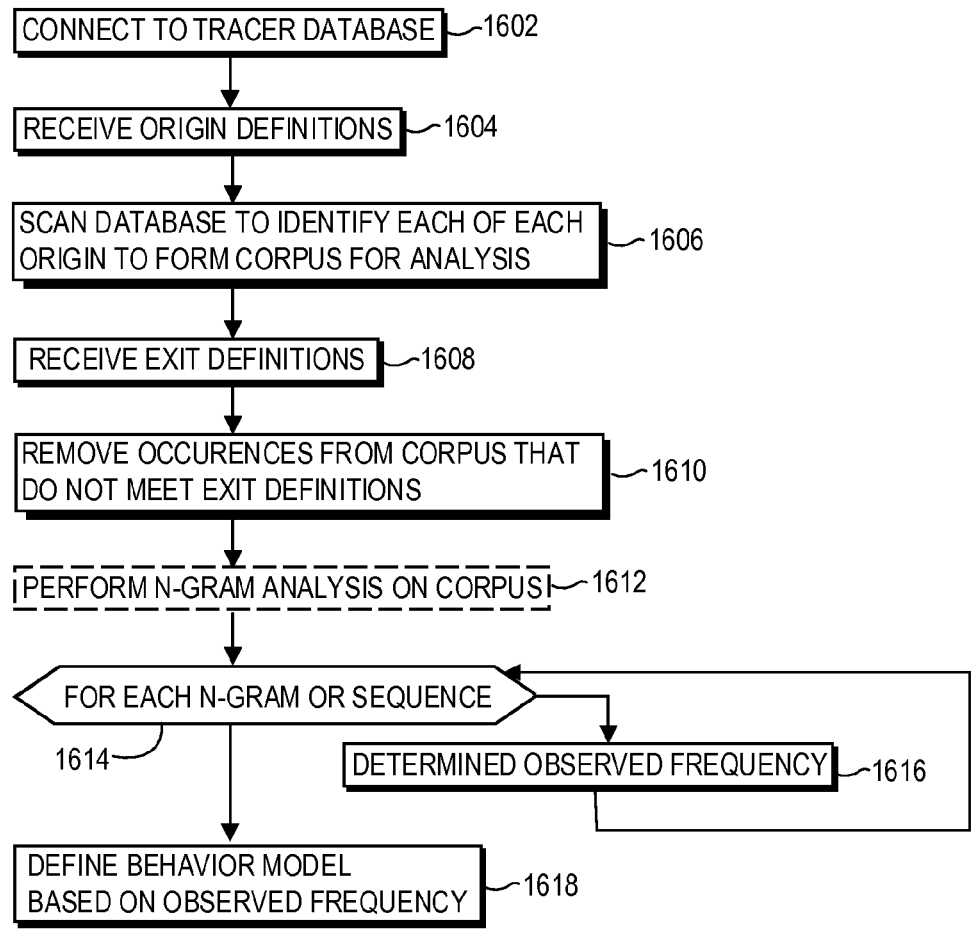
FIG. 16 is a flowchart illustration of an embodiment showing a method for creating a behavior model using origin and exits.

FIG. 16 is a flowchart illustration of an embodiment 1600 showing a method for creating a behavior model from origin and exit information. Embodiment 1600 may illustrate one mechanism for performing the operations of embodiment 1500.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 1600 may illustrate one mechanism to create a behavior model that may be deployed in the various manners described elsewhere in this specification. Such uses may include code coverage analysis, regression version analysis, visualizations, and other uses. The behavior model of embodiment 1600 may reflect the behavior of a subset of all the tracer data that may be collected from an application.

The operations of embodiment 1600 that may be performed by an analyzer, which may analyze tracer data after the data are collected and stored in a tracer database. Other embodiments may generate a behavior model on the fly by analyzing real time or near-real time data that may be gathered on an on-going basis.

A connection may be made to a tracer database in block 1602.

The origin definitions may be received in block 1604. The origin definitions may be a function, line number, or other identifier in the application. The origin definitions may identify a function name, application programming interface call, network or peripheral interaction, or some other operation. In some cases, the identifier may come from the source code, intermediate code, or compiled code.

The origin definition may include other parameters observed at the time the data are collected. The parameters may be variables passed to a function, a variable value, internal or external state of the application. In such a definition, a sequence may be defined by an origin when the conditions of the origin are met.

For example, an origin may be defined to occur at function "foo" and when "bar"="green". In such an example, a sequence that encounters "foo" but when "bar"="red" will not be included.

The tracer database may be scanned in block 1606 to identify each occurrence of a sequence that meets the origin definition.

The exit definitions may be received in block 1608. The exit definitions may be similar to the origin definitions as described above. The exit definitions may be used to further refine the corpus of sequences in block 1610.

An n-gram analysis of the corpus may be performed in block 1612. Some embodiments may omit this step.

For each n-gram or sequence identified in the corpus in block 1614, an observed frequency may be determined in block 1616. The behavior model may be defined in block 1618 from the observed frequency of the various sequences. The behavior model of block 1618 may then be used in the various uses described in this specification for other behavior models.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one hardware processor, said method comprising:
    receiving a first behavior model representing a frequency of observation of each of a first plurality of n-grams during execution of a first version of an application in a production environment, each n-gram in the first plurality of n-grams identifying a different sequence of one or more of (i) two or more function sequences observed during execution of the first version of the application in the production environment, or (ii) two or more input sequences input to the first version of the application during execution of the first version of the application in the production environment;
    generating a first performance metric for the first version of the application based on the first behavior model, including (i) determining a first representative sample of n-grams from the first plurality of n-grams, (ii) determining a first corresponding performance metric for each n-gram in the first representative sample of n-grams, and (iii) summing each first corresponding n-gram performance metric for all of the n-grams in the first representative sample of n-grams to obtain the first performance metric;

receiving a second behavior model representing a frequency of observation of each of a second plurality of n-grams during execution of a second version of the application in a testing environment, each n-gram in the second plurality of n-grams identifying a different sequence of one or more of (i) two or more function sequences observed during execution of the second version of the application in the testing environment, or (ii) two or more input sequences input to the second version of the application during execution of the second version of the application in the testing environment;

generating a second performance metric for the second version of the application based on the second behavior model, including (i) determining a second representative sample of n-grams from the second plurality of n-grams, (ii) determining a second corresponding performance metric for each n-gram in the second representative sample of n-grams, and (iii) summing each second corresponding n-gram performance metric for all of the n-grams in the second representative sample of n-grams to obtain the second performance metric; and generating a visualization comparing performance of the first version of the application in the production environment with the second version of the application in the testing environment, the visualization including:
one or more histograms visualizing the first plurality of n-grams and the second plurality of n-grams; and
one or more charts or graphs that present performance metrics for successive versions of the application, the one or more charts or graphs presenting at least the first performance metric and the second performance metric.

2. The method of claim 1, each representative sample comprising at least 50% of a total number of n-gram observations.

3. The method of claim 1, each representative sample comprising at least 75% of a total number of n-gram observations.

4. A system comprising:
one or more hardware processors; and
one or more computer-readable media having stored thereon computer-executable instructions that are executable by the one or more hardware processors to implement a version analyzer that is configured to perform at least the following:
receive a first behavior model representing a frequency of observation of each of a first plurality of n-grams during execution of a first version of an application in a production environment, each n-gram in the first plurality of n-grams identifying a different sequence of one or more of (i) two or more function sequences observed during execution of the first version of the application in the production environment, or (ii) two or more input sequences input to the first version of the application during execution of the first version of the application in the production environment;
generate a first performance metric for the first version of the application based on the first behavior model, including (i) determining a first representative sample of n-grams from the first plurality of n-grams, determining a first corresponding performance metric for each n-gram in the first representative sample of n-grams, and (ii) summing each first corresponding n-gram performance metric for all of the n-grams in the first representative sample of n-grams to obtain the first performance metric;

receive a second behavior model representing a frequency of observation of each of a second plurality of n-grams during execution of a second version of the application in a testing environment, each n-gram in the second plurality of n-grams identifying a different sequence of one or more of (i) two or more function sequences observed during execution of the second version of the application in the testing environment, or (ii) two or more input sequences input to the second version of the application during execution of the second version of the application in the testing environment;

generate a second performance metric for the second version of the application based on the second behavior model, including (i) determining a second representative sample of n-grams from the second plurality of n-grams, (ii) determining a second corresponding performance metric for each n-gram in the second representative sample of n-grams, and (iii) summing each second corresponding n-gram performance metric for all of the n-grams in the second representative sample of n-grams to obtain the second performance metric; and generate a visualization comparing performance of the first version of the application in the production environment with the second version of the application in the testing environment, the visualization including:
one or more histograms visualizing the first plurality of n-grams and the second plurality of n-grams; and
one or more charts or graphs that present performance metrics for successive versions of the application, the one or more charts or graphs presenting at least the first performance metric and the second performance metric.

5. The system of claim 4, each representative sample comprising at least 50% of a total number of n-gram observations.

6. A computer program product comprising one or more memories having stored thereon computer-executable instructions that are executable one or more processors to perform at least the following:
receive a first behavior model representing a frequency of observation of each of a first plurality of n-grams during execution of a first version of an application in a production environment, each n-gram in the first plurality of n-grams identifying a different sequence of one or more of (i) two or more function sequences observed during execution of the first version of the application in the production environment, or (ii) two or more input sequences input to the first version of the application during execution of the first version of the application in the production environment;
generate a first performance metric for the first version of the application based on the first behavior model, including (i) determining a first representative sample of n-grams from the first plurality of n-grams, determining a first corresponding performance metric for each n-gram in the first representative sample of n-grams, and (ii) summing each first corresponding n-gram performance metric for all of the n-grams in the first representative sample of n-grams to obtain the first performance metric;

receive a second behavior model representing a frequency of observation of each of a second plurality of n-grams during execution of a second version of the application in a testing environment, each n-gram in the second plurality of n-grams identifying a different sequence of one or more of (i) two or more function sequences observed during execution of the second version of the application in the testing environment, or (ii) two or more input sequences input to the second version of the application during execution of the second version of the application in the testing environment;

generate a second performance metric for the second version of the application based on the second behavior model, including (i) determining a second representative sample of n-grams from the second plurality of n-grams, (ii) determining a second corresponding performance metric for each n-gram in the second representative sample of n-grams, and (iii) summing each second corresponding n-gram performance metric for all of the n-grams in the second representative sample of n-grams to obtain the second performance metric; and generate a visualization comparing performance of the first version of the application in the production environment with the second version of the application in the testing environment, the visualization including:
one or more histograms visualizing the first plurality of n-grams and the second plurality of n-grams; and
one or more charts or graphs that present performance metrics for successive versions of the application, the one or more charts or graphs presenting at least the first performance metric and the second performance metric.

7. The computer program product of claim 6, wherein each behavioral model applies different weights to performance observations based on frequency of observation of one or more operations.

8. The computer program product of claim 6, wherein the computer system comprises the one or more processors.

9. The method of claim 1, wherein each behavioral model applies different weights to performance observations based on frequency of observation of one or more operations.

10. The method of claim 1, wherein the computer system comprises the at least one hardware processor.

11. The system of claim 4, wherein the system comprises the computing system.

12. The system of claim 4, wherein each behavioral model applies different weights to performance observations based on frequency of observation of one or more operations.

13. The method of claim 1, wherein determining a performance metric for an n-gram comprises:
determining an n-gram frequency for the n-gram;
determining an n-gram performance measurement associated with observation of the n-gram during execution of the application; and
multiplying the n-gram frequency by the n-gram performance measurement, to produce the performance metric for the n-gram.

14. The method of claim 13, wherein determining the n-gram performance measurement is based on at least one of processor utilization or memory utilization in connection with observation of the n-gram.

15. The system of claim 4, wherein determining a performance metric for an n-gram comprises:
determining an n-gram frequency for the n-gram;
determining an n-gram performance measurement associated with observation of the n-gram during execution of the application; and
multiplying the n-gram frequency by the n-gram performance measurement, to produce the performance metric for the n-gram.

16. The system of claim 15, wherein determining the n-gram performance measurement is based on at least one of processor utilization or memory utilization in connection with observation of the n-gram.

17. The computer program product of claim 6, wherein determining a performance metric for an n-gram comprises:
determining an n-gram frequency for the n-gram;
determining an n-gram performance measurement associated with observation of the n-gram during execution of the application; and
multiplying the n-gram frequency by the n-gram performance measurement, to produce the performance metric for the n-gram.

18. The computer program product of claim 17, wherein determining the n-gram performance measurement is based on at least one of processor utilization or memory utilization in connection with observation of the n-gram.

* * * * *